US011425606B1

United States Patent
Al-Bado et al.

(10) Patent No.: US 11,425,606 B1
(45) Date of Patent: Aug. 23, 2022

(54) DIRECT MVNO RAN RESOURCE MANAGEMENT SYSTEM

(71) Applicant: Dell Products L.P., Round Rock, TX (US)

(72) Inventors: Mustafa Al-Bado, Cork (IE); Thuy Truong, Youghal (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/319,235

(22) Filed: May 13, 2021

(51) Int. Cl.
*H04W 28/16* (2009.01)
*H04W 88/18* (2009.01)
*H04W 24/02* (2009.01)
*H04W 72/04* (2009.01)

(52) U.S. Cl.
CPC .......... *H04W 28/16* (2013.01); *H04W 24/02* (2013.01); *H04W 72/0406* (2013.01); *H04W 88/18* (2013.01)

(58) Field of Classification Search
CPC ..... H04W 48/18; H04W 16/00; H04W 16/06; H04W 4/24; H04W 4/50
See application file for complete search history.

(56) References Cited

U.S. PATENT DOCUMENTS

| 2019/0007899 A1* | 1/2019 | Vrzic | H04W 76/00 |
| 2021/0352670 A1* | 11/2021 | Al-Bado | H04L 61/5007 |
| 2022/0141821 A1* | 5/2022 | D'Oro | H04W 84/04 |
| | | | 455/452.1 |

* cited by examiner

*Primary Examiner* — Kevin Kim
(74) *Attorney, Agent, or Firm* — Joseph Mencher

(57) ABSTRACT

A networked system includes Infrastructure Provider (InP) system(s) that couple a Mobile Virtual Network Operator (MVNO) system to physical Radio Access Network (RAN) resources. The InP system(s) are configured to provide a direct MVNO RAN resource management system for the MVNO system that virtualizes a portion of the physical RAN resources to provide virtualized RAN resources that are allocated to the MVNO system. When the direct MVNO RAN resource management system receives a virtualized RAN resource command from the MVNO system that is directed to the virtualized RAN resources, it automatically translates the virtualized RAN resource command to a physical RAN resource command that is configured to cause the performance of management operation(s) associated with the portion of the physical RAN resources, and then automatically transmits the physical RAN resource command to cause the performance of the management operation(s) associated with the portion of the physical RAN resources.

20 Claims, 23 Drawing Sheets

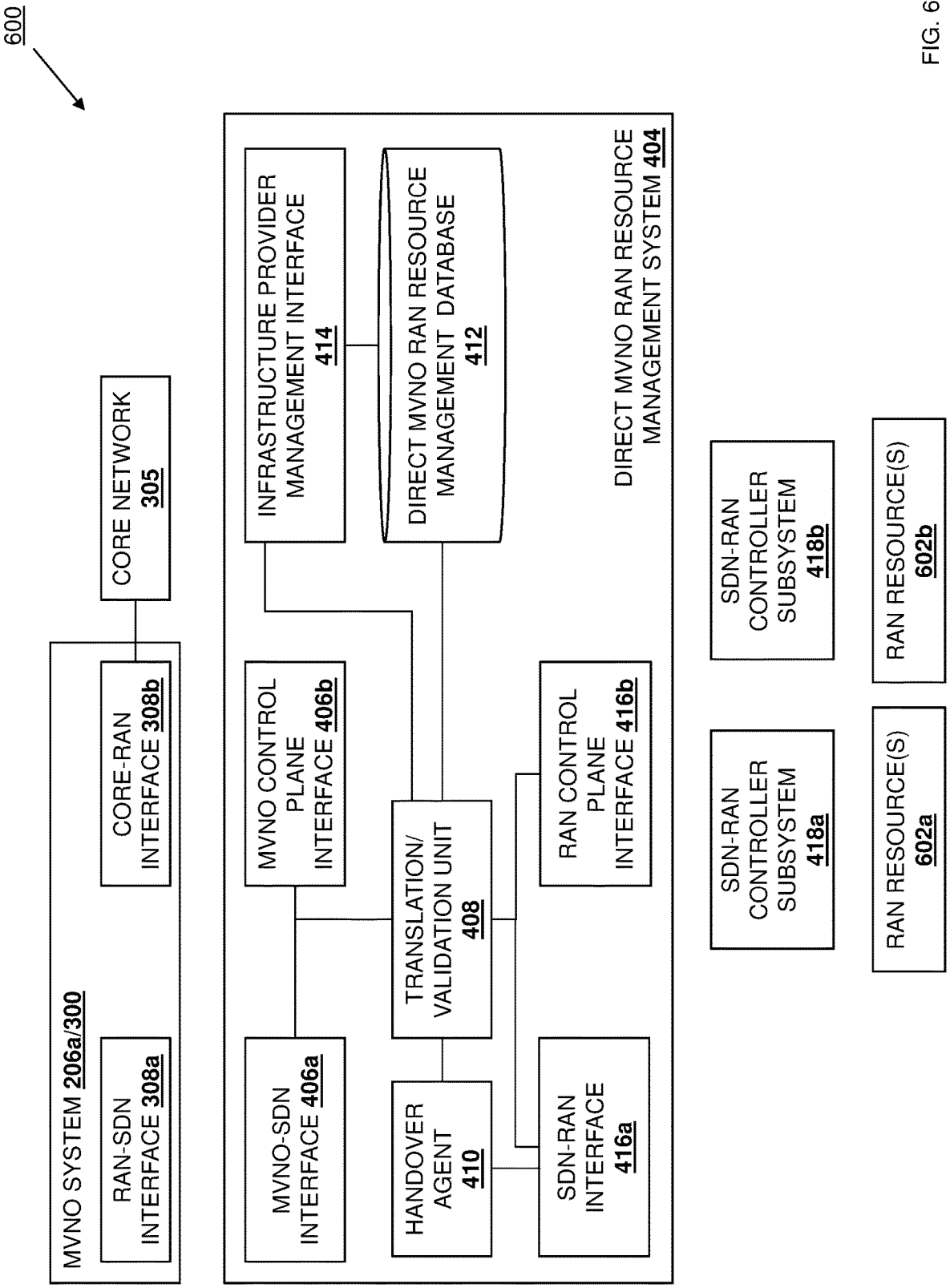

DIRECT MVNO RAN RESOURCE MANAGEMENT SYSTEM

BACKGROUND

The present disclosure relates generally to information handling systems, and more particularly to the direct management of Radio Access Network (RAN) resources by Mobile Virtual Network Operators (MVNOs) to enable communication between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, mobile phones, tablet computing devices, laptop/notebook computing devices, and/or other computing devices known in the art, utilize Radio Access Networks (RANs) to perform wireless communications with other computing devices (e.g., server devices, other mobile phones, tablet computing devices, laptop/notebook computing devices, etc.). For example, RANs may enable $4^{th}$ Generation (4G) and $5^{th}$ generation (5G) wireless communications via RAN resources (e.g., RAN radio towers and related RAN equipment) that are owned and managed by Infrastructure Providers (InPs) such as AT&T, T-Mobile, Verizon, and/or other InP orchestrators known in the art. Furthermore, Mobile Virtual Network Operators (MVNO's) such as Air Voice (via AT&T), Altice Mobile (via AT&T), Allvoi Wireless (via Sprint Nextel), Affinity Mobile (via Verizon), and/or other MVNO's known in the art may lease the portions of the RAN resources (called RAN "slices") from the InPs for use in providing wireless telephone and data services to their customers. However, RAN slices leased from InPs by MVNO's are managed by the InPs rather than the MVNOs, which greatly limits the ability/flexibility of the MVNOs in managing and optimizing the services they provide via those leased RAN slices, particularly with regard to the Quality of Service (QoS) and Quality of Experience (QoE) of their subscribers/customers. As such, MVNOs are typically limited to requesting that they be allocated RAN resources from an InP that cover particular physical area(s) with some QoS level(s) (e.g., with regard to bandwidth, jitter, delay, and/or other quality characteristics known in the art), followed by no ability to adjust those RAN resource characteristics without generating a subsequent request to the InP and waiting for that request to be satisfied.

For example, because the InPs tend to take the sole responsibility of managing the RAN slices reserved for the MVNOs, the MVNOs are not able to control their RAN slices with regard to creating, updating, and deleting services provide to their "vertical" markets (e.g., companies, industries, and/or organizations operating in a specific sector with particular applications and/or QoS guarantees, also called "verticals"), performing handover operations for their clients, and/or other performing other RAN management operations known in the art. As such, the services provided by MVNOs are often less than optimal, with QoS often constrained in services provided to verticals, and the only recourse for MVNOs when RAN resource performance issues occur is to report them to the InP and wait for them to be addressed. Furthermore, the inability to control RAN slices impacts RAN resource provisioning and planning by MVNOs, as activities such as load balancing between RANs is not controlled by the MVNOs, but rather is under the control of the InPs.

To provide another example, multi-domain activities in conventional RAN systems are limited because they require many parties to be involved, which can severely impact MVNO performance in a multi-domain context such as multi-domain network provisioning, planning, and load-balancing. As such, an MVNO in a multi-domain context will not be able to provide a QoS-guaranteed service for its own customers unless 1) there is an underlying relationship among the InPs in every single multi-domain service/RAN slice, and 2) those InPs coordinate and cooperate to achieve the service QoS assurance in multi-domain RAN slice provided/offered to the customers by the MVNO, which is impractical in current RAN systems that limit MVNOs to operating with a particular InP.

In yet another example, MVNO's may be involved in business partnerships with InPs in order to offer end to end (E2E) services to their verticals/customers/subscribers, but those E2E services will run on top of the InP infrastructure, and the InPs do not share client physical, Media Access Control (MAC), and network layer status and statistical information with the MVNOs. As such, the MVNOs tend to have relatively limited knowledge about the performance status (e.g., fault status) of its E2E service/RAN slice server offerings, and the experience of their clients can be negatively affected and is often not guaranteed, while the network planning and provisioning by the MVNOs is often severely impacted as well. In a final example, conventional RAN systems are subject to scaling difficulties, as the InPs operate to explicitly manage their own clients, while implicitly managing the client of the MVNOs as well.

Accordingly, it would be desirable to provide a RAN resource management system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a first direct Mobile Virtual Network Operator (MVNO) Radio Access Network (RAN) resource management system for a first MVNO system, wherein the first direct MVNO RAN resource management system is configured to: virtualize a first portion of a plurality of physical RAN resources to provide first virtualized RAN resources that are allocated to the first MVNO system; receive, from the first MVNO system, a first virtualized RAN resource command that is directed to the first virtualized RAN resources allocated to the first MVNO system; automatically translate, in response to receiving the first virtualized RAN resource command, the first virtualized RAN resource command to a first physical RAN resource command that is configured to cause the performance of at least one first management operation associated with the first portion of the plurality of physical RAN resources; and automatically transmit, subsequent to translating the first virtualized RAN resource command to the first physical RAN resource command, the first physical RAN resource command to cause the performance of the at least one first management operation associated with the first portion of the plurality of physical RAN resources.

BRIEF DESCRIPTION OF THE DRAWINGS

FIG. 6 is a schematic view illustrating an embodiment of the networked system of FIG. 2 operating during the method of FIG. 5.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
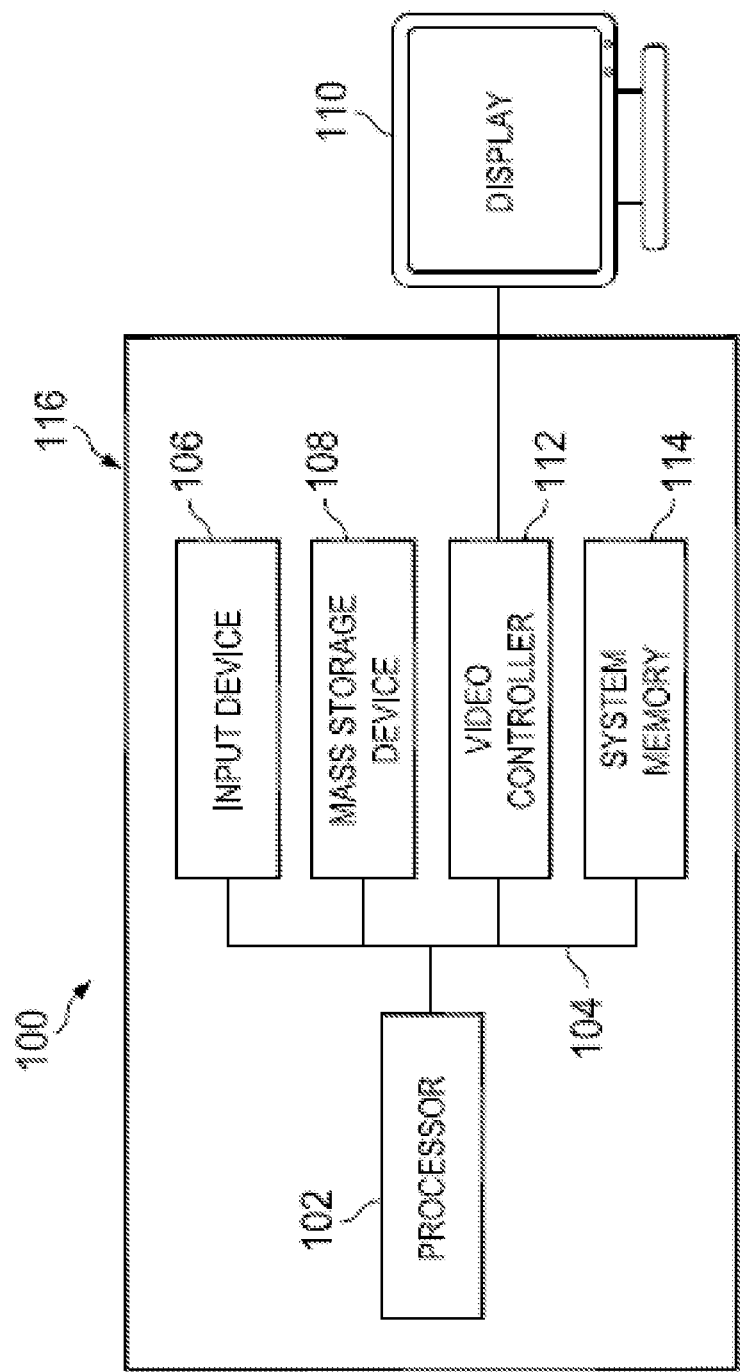
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
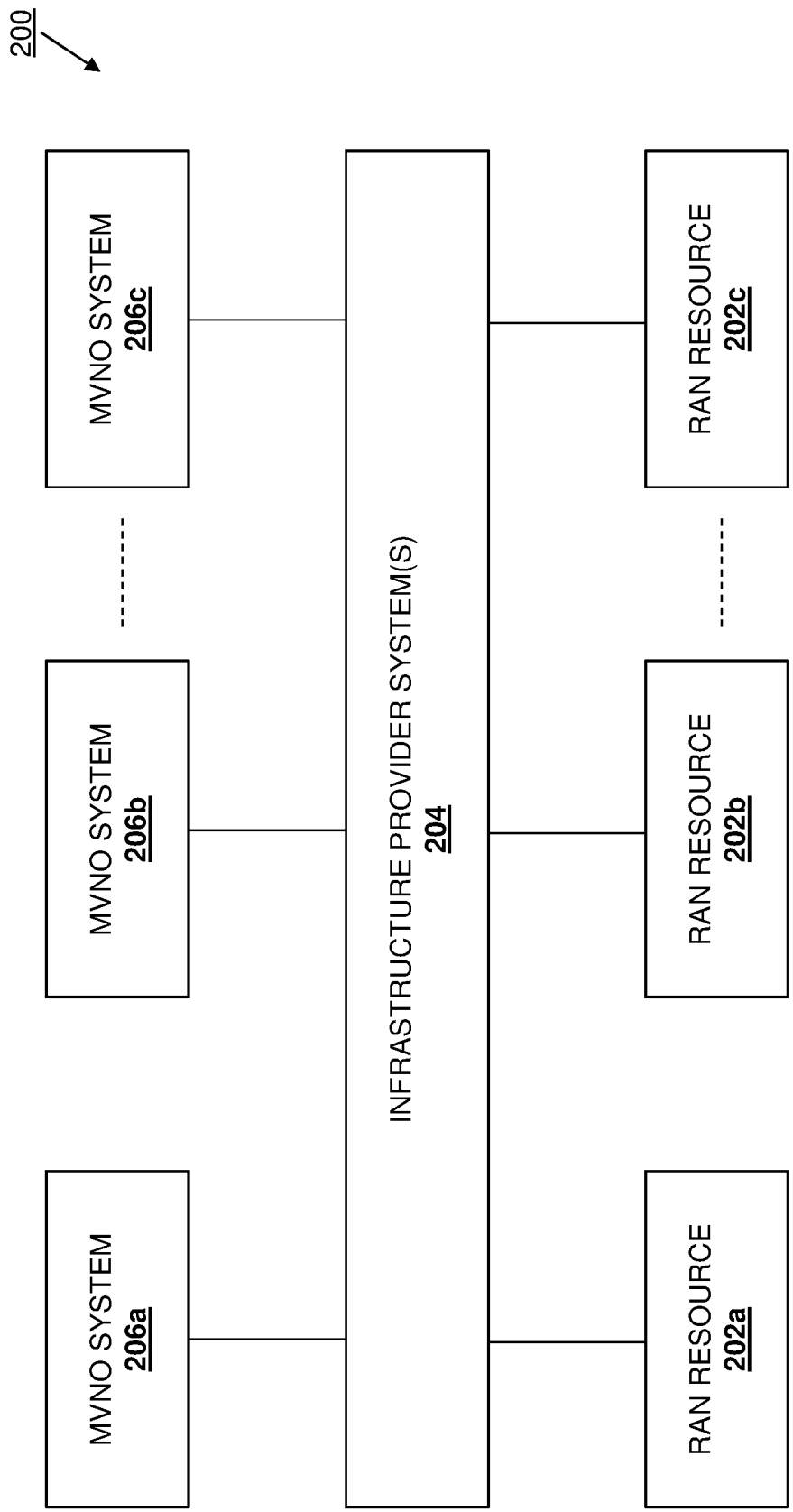
FIG. 2 is a schematic view illustrating an embodiment of networked system that may provide the direct MVNO RAN resource management system of the present disclosure.

Referring now to FIG. 2, an embodiment of a networked system 200 is illustrated that may provide the direct MVNO RAN resource management system of the present disclosure. In the illustrated embodiment, the networked system 200 includes a plurality of RAN resources 202a, 202b, and up to 202c, any or all of which may include RAN radio towers and/or any of a variety of associated RAN equipment that would be apparent to one of skill in the art in possession of the present disclosure. In the illustrated embodiment, one or more Infrastructure Provider (InP) systems 204 are coupled to the RAN resources 202a-202c, and one of skill in the art in possession of the present disclosure will recognize that the "coupling" of the InP system(s) 204 and the RAN resources 202a-202c may refer to any ability to perform wireless communication with the RAN resources 202a-202c as well as referring to physical couplings (e.g., cabling) with the RAN resources 202a-202c. In an embodiment, any of the InP systems 204 may be provided by the IHS 100 discussed above with reference to FIG. 1, and/or may include some or all of the components of the IHS 100, and in specific examples may include combinations of server devices, storage systems, networking devices (e.g., switch devices), as well as any other RAN infrastructure components that one of skill in the art in possession of the present disclosure would recognize as being included in an InP system and conventionally controlled and managed by an InP. However, while illustrated and discussed as including particular components, one of skill in the art in possession of the present disclosure will recognize that InP systems provided in the networked system 200 may include any devices that may be configured to operate similarly as the InP systems discussed below.

In the illustrated embodiment, a plurality of Mobile Virtual Network Operator (MVNO) systems 206a, 206b, and up to 206c are coupled to the InP system(s) 204. For example, any of the MVNO systems 206a-206c may be provided by the IHS 100 discussed above with reference to FIG. 1, and/or may include some or all of the components of the IHS 100, and in specific examples may include one or more server devices. However, while illustrated and discussed as being provided by server devices, one of skill in the art in possession of the present disclosure will recognize that MVNO systems provided in the networked system 200 may include any devices that may be configured to operate similarly as the MVNO systems discussed below. Furthermore, while a specific networked system 200 has been illustrated and described, one of skill in the art in possession of the present disclosure will recognize that the direct MVNO RAN resource management system 200 of the present disclosure may include a variety of components and component configurations while remaining within the scope of the present disclosure as well.

Figure 3:
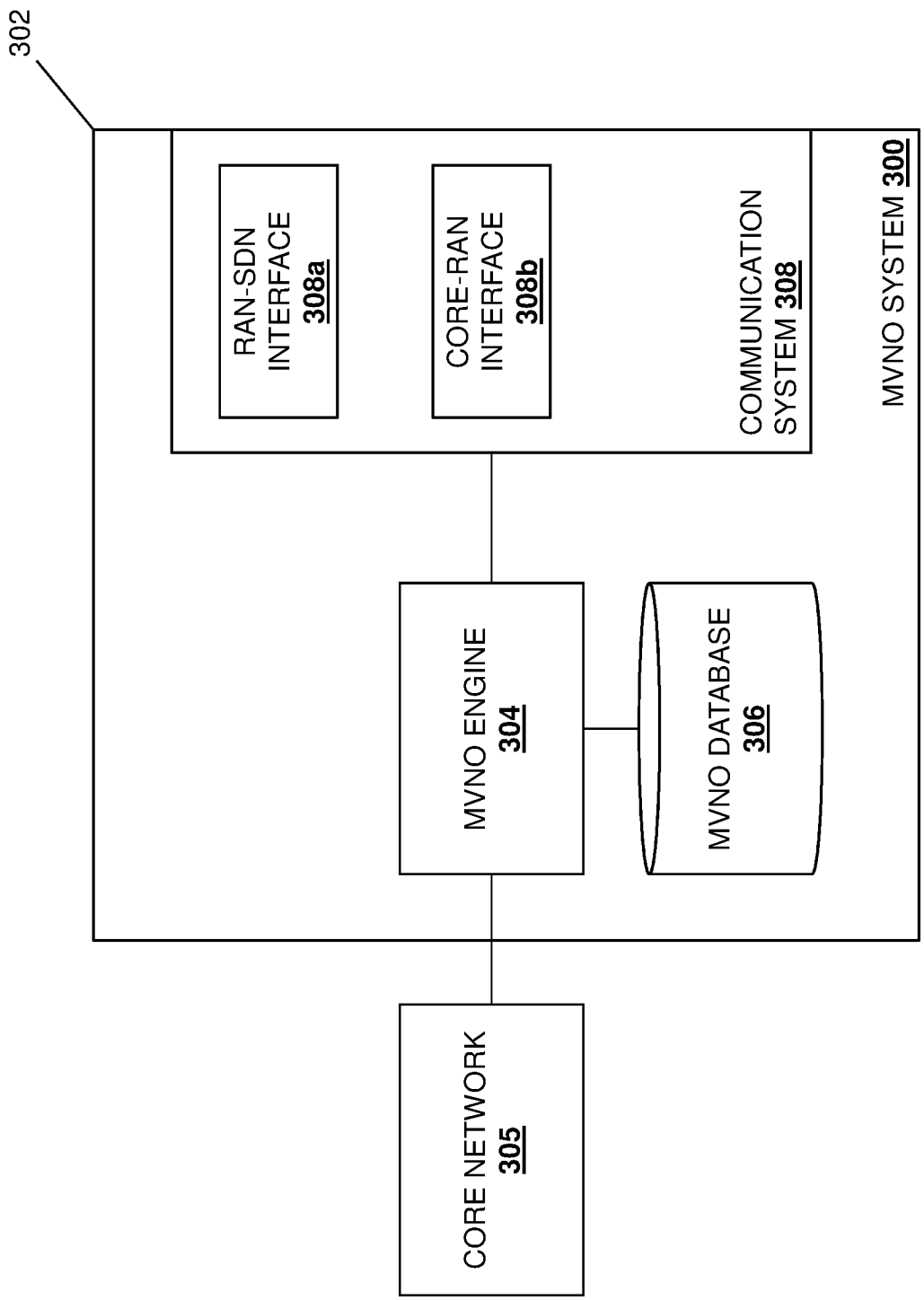
FIG. 3 is a schematic view illustrating an embodiment of an MVNO system that may be included in the networked system of FIG. 2.

Referring now to FIG. 3, an embodiment of an MVNO system 300 is illustrated that may provide any or each of the MVNO systems 206a-206c discussed above with reference to FIG. 2. As such, the MVNO system 300 may be provided by the IHS 100 discussed above with reference to FIG. 1 and/or may include some or all of the components of the IHS 100, and in specific examples may be provided by one or more server devices. However, while illustrated and discussed as being provided by one or more server devices, one of skill in the art in possession of the present disclosure will recognize that the functionality of the MVNO system 300 discussed below may be provided by other devices that are configured to operate similarly as the MVNO system 300 discussed below. In the illustrated embodiment, the MVNO system 300 includes a chassis 302 that houses the components of the MVNO system 300, only some of which are illustrated below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an MVNO engine 304 that is configured to perform the functionality of the MVNO engines and/or MVNO systems discussed below. As illustrated in FIG. 3, the MVNO engine 304 in the MVNO system 300 may be coupled to a core network 305 that one of skill in the art in possession of the present disclosure will appreciate may be controlled by the MVNO that operates the MVNO system 300.

The chassis 302 may also house a storage system (not illustrated, but which may include the storage 108 discussed above with reference to FIG. 1) that is coupled to the MVNO engine 304 (e.g., via a coupling between the storage system and the processing system) and that includes a MVNO database 306 that is configured to store any of the information utilized by the MNVO engine 304 discussed below. The chassis 302 may also house a communication system 308 that is coupled to the MVNO engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure.

In the specific example illustrated and discussed below, the communication system 308 is illustrated as including a Radio Access Network-Software Defined Network (RAN-SDN) interface 308a and core-RAN interface 308b that are described below as including functionality that one of skill in the art in possession of the present disclosure will recognize may be provided by the MVNO engine 304, the communication system 308, and/or combinations thereof. However, while a specific MVNO system 300 has been illustrated and described, one of skill in the art in possession of the present disclosure will recognize that MVNO systems (or other devices operating according to the teachings of the present disclosure in a manner similar to that described below for the MVNO system 300) may include a variety of components and/or component configurations for providing conventional MVNO system functionality, as well as the functionality discussed below, while remaining within the scope of the present disclosure as well.

Figure 4:
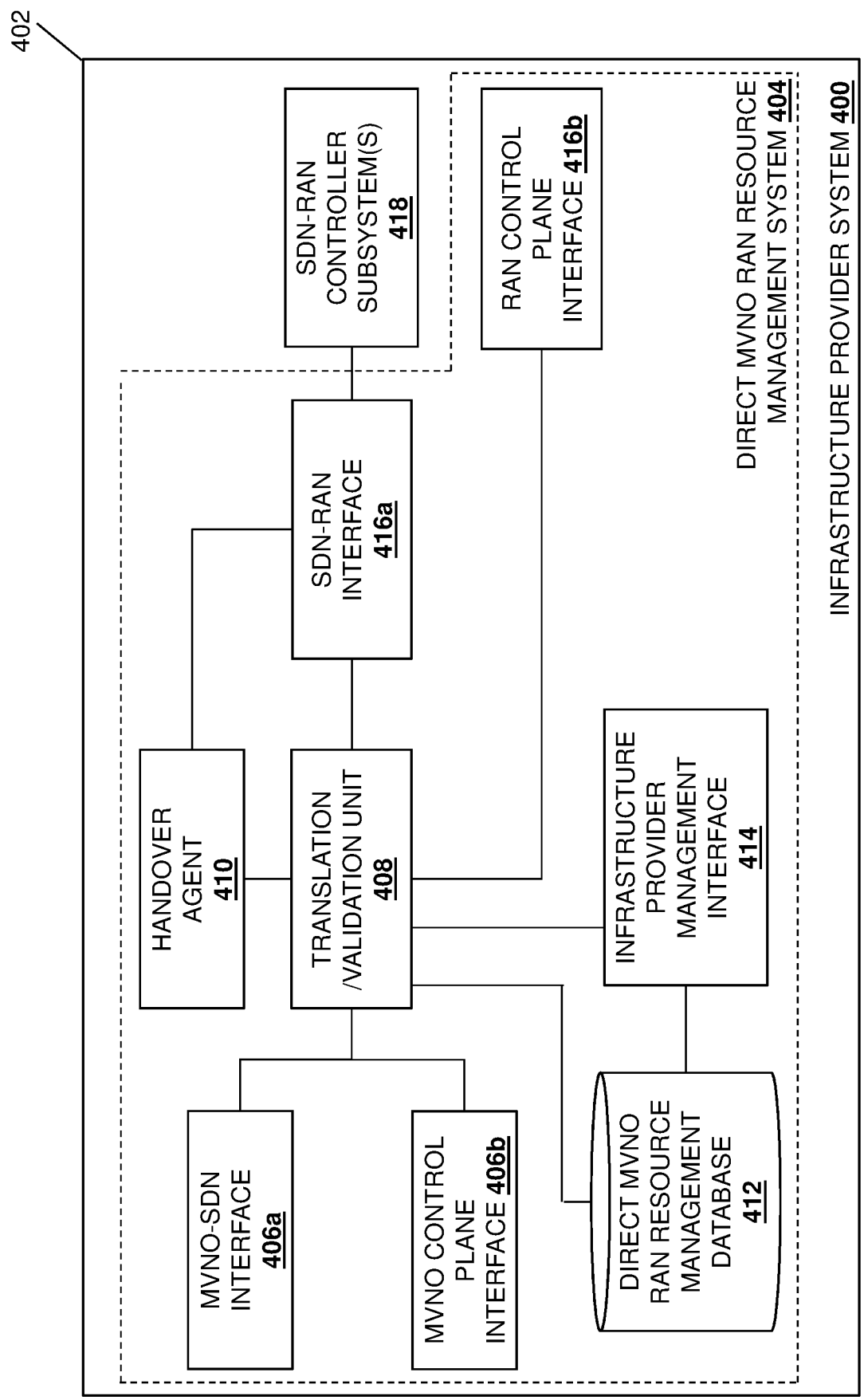
FIG. 4 is a schematic view illustrating an embodiment of an Infrastructure Provider (InP) system that may be included in the networked system of FIG. 2.

Referring now to FIG. 4, an embodiment of an InP system 400 is illustrated that may provide the any or each of the InP system(s) 204 discussed above with reference to FIG. 2. As such, the InP system 400 may be provided by the IHS 100 discussed above with reference to FIG. 1 and/or may include some or all of the components of the IHS 100, and in specific examples may include combinations of server devices, storage systems, networking devices (e.g., switch devices), as well as any other RAN infrastructure components that would be apparent to one of skill in the art in possession of the present disclosure. However, while illustrated and discussed as including particular components, one of skill in the art in possession of the present disclosure will recognize that the functionality of the InP system 400 may be provided by other devices that are configured to operate similarly as the InP system 400 discussed below. In the illustrated embodiment, the InP system 400 includes a chassis 402 that houses the components of the InP system 400, only some of which are illustrated below. For example, the chassis 402 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a direct MVNO RAN resource management system 404 that is configured to perform the functionality of the direct MVNO RAN resource management systems and/or InP systems discussed below.

As discussed in further detail below, a respective direct MVNO RAN resource management system that is substantially similar to the direct MVNO RAN resource management system illustrated in FIG. 4 may be provided for each MVNO system connected to the InP system 400, and operates as a virtualized layer between those MVNO systems and SDN-RAN controller subsystem(s) in the InP system 400 (discussed below) to enable direct access and control by the MVNO systems over portions of the RAN resources that are allocated to those MVNO systems and that are accessible via the SDN-RAN controller subsystem(s). As discussed in further detail below, the direct MVNO RAN resource management system allows the InP system to hide (or otherwise not expose) some or all of its infrastructure components and/or resources (physical or virtual) from the MVNO system, while enabling the MVNO system for which that direct MVNO RAN resource management system is provided to manage, monitor, and orchestrate their allocated portion of the RAN resources via interfaces (e.g., Application Programming Interfaces (APIs) and other interfaces known in the art). As such, MVNO systems may be provided a set of control functions that enable direct RAN resource control over their allocated portion of the RAN resources that are exposed via the interfaces in their direct MVNO RAN resource management system, while having little to no knowledge of the details of the underlying SDN-RAN controller subsystems, topologies, and/or locations of the infrastructure that enables that RAN resource control.

In the illustrated embodiment, the direct MVNO RAN resource management system 404 includes an MVNO-SDN interface 406a and an MVNO control plane interface 406a that are each coupled to a translation/validation unit 408. As discussed below, the MVNO-SDN interface 406a is configured to enable communications with the RAN-SDN interface 308a in the MVNO system 300 discussed above with reference to FIG. 3, and in specific examples may receive RAN queries (e.g., physical layer (PHY)/Media Access Control (MAC) statistics, radio measurements for user equipment or intra-RAN slices, etc.) and RAN-SDN actions (e.g., creating, deleting, and updating RAN slices; performing X2/S1 SDN handover; etc.) from an MVNO system and forward them to the translation/validation unit 408, while also responding to that MVNO system after receiving results back from the translation/validation unit 408.

As also discussed below, the MVNO control plane interface 406b is configured to enable communications with the core-RAN interface 308b in the MVNO system 300 discussed above with reference to FIG. 3, and in specific examples may forward control plane traffic between the core network 305 discussed above with reference to FIG. 3 and the RAN resources (e.g., NG-c for 5G networks and S1-c for 4G networks). In some embodiments, the MVNO control plane interface 406b may be configured to create a separate Virtual Network Interface (VNI) to serve a control plane for each MVNO system (e.g., each core-RAN pair), and in specific examples, the translation/validation unit 408 may manipulate control plane traffic transmitted with the MVNO control plane interface 406b by replacing RAN resource Internet Protocol (IP) addresses with VNI IP addresses in communications directed to the MVNO system, replacing VNI IP addresses with RAN resource Internet Protocol (IP) addresses in communications directed to the SDN controller subsystems(s), and/or performing any other control plane traffic manipulations that would be apparent to one of skill in the art in possession of the present disclosure (an example of which is described below with reference to FIG. 8). As discussed above, the MVNO-SDN interface 406a and the MVNO control plane interface 406a operate with the translation/validation unit 408 to ensure that the MVNO system is unaware of the SDN-RAN controller subsystems, topologies, and/or locations of the infrastructure that enables that RAN resource control described herein, allowing the MVNO system to simply send the communications discussed above, while the direct MVNO RAN resource management system 404 directs those communications to the appropriate SDN controller subsystem(s).

As such, the translation/validation unit 408 operates to prevent the MVNO system from identifying the infrastructure in the InP system 400, and may be provided with a VNI mapping database that allows the translation/validation unit 408 to translate packets/traffic between the core network 305 discussed above with reference to FIG. 3 and the infrastructure included in and connected to the InP system 400 in order to allow the direct MVNO RAN resource control functionality discussed below while hiding the topology and infrastructure in the InP system 400 from the MVNO systems, the MVNO-SDN interface 406a, and the MVNO control plane interface 406a. Furthermore, the translation/validation unit 408 may be provided with a RAN-SDN controller subsystem map for any particular MVNO system that utilizes RAN-SDN controller subsystem(s) in the InP system 400. As will be appreciated by one of skill in the art in possession of the present disclosure, the translation/validation unit 408 allows the InP system 400 to present MVNO systems with a virtual topology that allows those MVNO systems to observe and collect data related to their clients (e.g., customized measurements of the use of their allocated RAN resources such Fault, Configuration, Accounting, Performance, and Security (FCAPS) status measurements), perform management operations associated with their allocated portions of the RAN resources, and/or perform other control/management operations that would be apparent to one of skill in the art in possession of the present disclosure (e.g., MVNO systems may be provided with a Global Positioning Satellite (GPS) location of a RAN resource tower, but not the actual RAN resource structure (e.g., eNB or functional split eNB)).

The direct MVNO RAN resource management system 404 also includes a handover agent 410 that is coupled to the translation/validation unit 408 and that, as discussed below, may operate to manage SDN handovers (e.g., X2-SDN handovers, S1-SDN handovers, etc.) Such handover management may be enabled via a list a X2 links that are associated with the portion of the RAN resources allocated to any MVNO system and that may be provided by the InP system 400 to that MVNO system, and due to the hiding of the infrastructure/underlying SDN topology from the MVNO system, the handover agent 410 may operate to manage handovers between RAN-SDN controller subsystem(s) that share RAN resources connected with X2 links. As such, in large deployments, several direct MVNO RAN resource management systems may be provided for scalability purposes, and their corresponding handover agents may communicate to assure successful handovers (examples of which are described below with reference to FIGS. 9A-9J and 10).

The direct MVNO RAN resource management system 404 also includes a direct MVNO RAN resource management database 412 that is coupled to the translation/validation engine 408 and that, as discussed below, may store RAN resource configuration information, RAN resource credential information, RAN resource mapping information, and/or any other RAN resource information that would be apparent to one of skill in the art in possession of the present disclosure. The information stored in the direct MVNO RAN resource management database 412 may be utilized by the components in the direct MVNO RAN resource management system to perform security tasks, configuration tasks, translation tasks that hide infrastructure from the MVNO systems, and/or any of the other tasks discussed below.

The direct MVNO RAN resource management system 404 also includes an infrastructure provider management interface 414 that is coupled to each of the translation/validation unit 408 and the direct MVNO RAN resource management database 412, and that may be utilized to configure the direct MVNO RAN resource management system 404 by, for example, installing credentials, providing RAN resource information, mapping RAN resources allocated to an MVNO system to that direct MVNO RAN resource management system 404, and/or performing other functionality described below. In some examples, the infrastructure provider management interface 414 may notify the translation/validation unit 408 of any updates in order to ensure that information utilized by the translation/validation unit 408 remains up to date. As such, the infrastructure provider management interface 414 may be utilized to control and manage which infrastructure information may be exposed to the MVNO systems, how the RAN resources may be provided to MVNO systems, and/or other InP management operations that one of skill in the art in possession of the present disclosure would recognize as enabling and/or allowing the subsequent direct MVNO RAN resource management functionality by the MVNO systems discussed below.

The direct MVNO RAN resource management system 404 also includes an SDN-RAN interface 416a that is coupled to the translation/validation unit 408 and the handover agent 410, and that operates to communicate directly with RAN-SDN controller subsystem(s) 418 that are included in the InP system 400. In a specific example, the SDN-RAN interface 416a may operate to transit SDN communications between the handover agent 410 and the RAN-SDN controller subsystem(s) 418, and between the MVNO systems and the RAN-SDN controller subsystems 418 via the translation/validation unit 408. The direct MVNO RAN resource management system 404 also includes a RAN control plane interface 416b that is coupled to the translation/validation unit 408, and that operates to transfer translated control plane communications from the direct MVNO RAN resource management system 404 to RAN resources, as well as from RAN resources to MVNO systems via the translation/validation unit 408. However, while a specific InP system 400 has been illustrated and described, one of skill in the art in possession of the present disclosure will recognize that InP systems (or other devices operating according to the teachings of the present disclosure in a manner similar to that described below for the InP system 400) may include a variety of components and/or component configurations for providing conventional InP system functionality, as well as the functionality discussed below, while remaining within the scope of the present disclosure as well.

Figure 5:
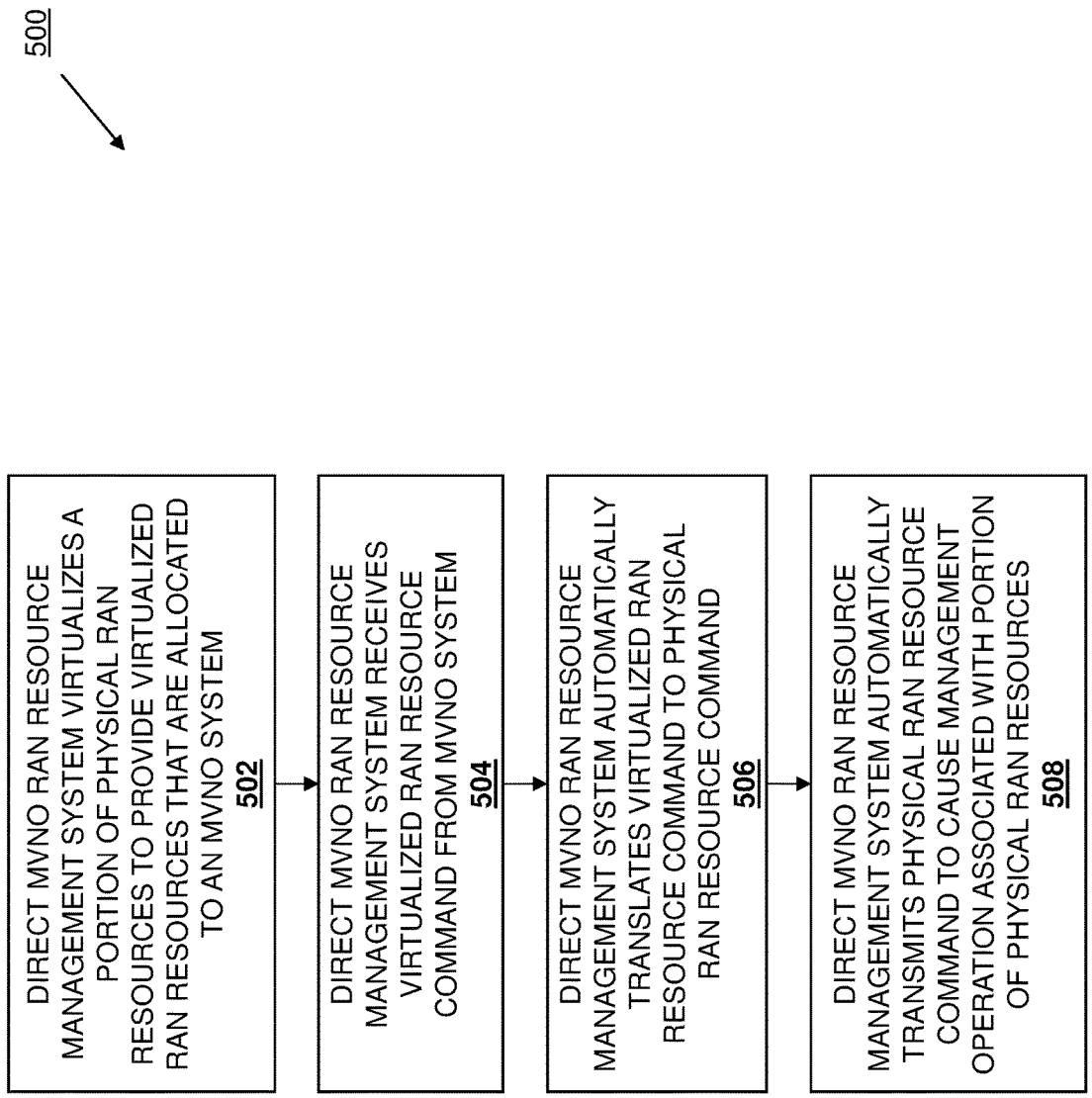
FIG. 5 is a flow chart illustrating an embodiment of a method for providing direct management of RAN resources by an MVNO.

Referring now to FIG. 5, an embodiment of a method 500 for providing direct management of RAN resources by an MVNO is illustrated. As discussed below, the systems and methods of the present disclosure allow InP systems to abstract SDN-enabled RAN control subsystems and expose RAN resource control functions to MVNO systems in order to provide the MVNO subsystems the interfaces (e.g., APIs) needed to directly manage, observe, and orchestrate their portion of RAN resources allocated to them by the InP systems. For example, Infrastructure Provider (InP) system(s) may couple a Mobile Virtual Network Operator (MVNO) system to physical Radio Access Network (RAN) resources. The InP system(s) are configured to provide a direct MVNO RAN resource management system for the MVNO system that virtualizes a portion of the physical RAN resources to provide virtualized RAN resources that are allocated to the MVNO system. When the direct MVNO RAN resource management system receives a virtualized RAN resource command from the MVNO system that is directed to the virtualized RAN resources, it automatically translates the virtualized RAN resource command to a physical RAN resource command that is configured to cause the performance of management operation(s) associated with the portion of the physical RAN resources, and then automatically transmits the physical RAN resource command to cause the performance of the management operation(s) associated with the portion of the physical RAN resources.

As such, each direct MVNO RAN resource management system may provide a virtualized layer between SDN-RAN controller subsystems and an MVNO system that abstracts the underlying network topology and infrastructure while exposing some level of RAN control functionality to the MVNO system that provides the MVNO system with direct access to and control of its allocated portion of the RAN resources, allowing the MVNO system to create and modify RAN slices tailored to the needs of its verticals, observe and optimize its RAN slices, reconfigure RAN slices based on RAN resource monitoring in order to achieve particular levels of QoS and QoE at runtime, and/or otherwise manage/control its allocated RAN resources directly without impacting the RAN resources allocated to other MVNO systems (e.g., via RAN resource isolation) and without the need to have those management/control operations manually carried out by InPs as is done in conventional systems (thus reducing RAN resource management burdens on the InPs by sharing them with the MVNOs). Furthermore, each direct MVNO RAN resource management system hides the actual topology of the InP system from its corresponding MVNO system while providing the high flexibility and direct access for that MVNO system to its allocated RAN slice, thus facilitating adoption by InP systems that are hesitant to expose their infrastructure. Finally, the direct MVNO RAN resource management systems support multi-domain MVNO deployment and SDN-handover operations by leveraging the direct access of RAN slices and handover agent functionality included in the direct MVNO RAN resource management systems, and allowing MVNO systems that provide end-to-end services to multiple/diverse verticals to take advantage of the direct RAN slice control to quickly tune configurations of (and take immediate action associated with) RAN slices to tailor their operation to the needs of those verticals in order to meet QoS and QoE guarantees.

Referring now to FIG. 6, an embodiment 600 of the networked system 200 described above with reference to FIG. 2 is illustrated that includes the MVNO system 206a/300, the direct MVNO RAN resource management system 404 and SDN-RAN controller subsystems 418a and 418b (provided by an InP system 204/400), and physical RAN resource(s) 602a and 602b. In an embodiment, the direct MVNO RAN resource management system 404 may have been created by the InP system 204/400 for the MVNO system 206a/300, and operates to connect the MVNO system 206a to the SDN controller subsystem(s) 418a and 418b that have access to the physical RAN resources 602a and 602b that include a portion of the RAN resources 202a-202c discussed above with reference to FIG. 2 that have been allocated to the MVNO system 206a. As will be appreciated by one of skill in the art in possession of the present disclosure, the creation of the direct MVNO RAN resource management system 404 may include allocating the physical RAN resources 602a and 602b for the MVNO system 206a, defining those physical RAN resources 602a and 602b in the direct MVNO RAN resource management database 412, setting the details of the use of the physical RAN resources 602a and 602b in the direct MVNO RAN resource management database 412, and/or performing other direct MVNO RAN resource management system creation operations that would be apparent to one of skill in the art in possession of the present disclosure.

As will be appreciated by one of skill in the art in possession of the present disclosure, the deployment of an instance of the direct MVNO RAN resource management system of the present disclosure by an InP system may require direct or indirect (i.e., via brokers) agreement between the corresponding MVNO system and that InP system. That agreement may include (is but is not limited to) the coverage areas, the lower bound limit for number of RAN per area, QoS constraints, defining the operational protocol and interfaces between the MVNO system and the direct MVNO RAN resource management system, and/or other characteristics that would be apparent to one of skill in the art in possession of the present disclosure. Furthermore, when an MVNO system subscribes to a network service with an InP system, the InP system will instantiate a direct MVNO RAN resource management system, configure the mapping between the allocated physical and logical RAN resources, update the information into the direct MVNO RAN resource management database for that direct MVNO RAN resource management system accordingly, and/or perform other operations that would be apparent to one of skill in the art in possession of the present disclosure. The InP system may then create user credentials and user roles, and pass that information together with the interfaces/APIs to the MVNO system so that the MVNO system may access to their RAN resources accordingly.

The method 500 begins at block 502 where a direct MVNO RAN resource management system virtualizes a portion of physical RAN resources to provide virtualized RAN resources that are allocated to an MVNO system. In an embodiment, at block 502, the physical RAN resources 602a and 602b may be virtualized by the direct MVNO RAN resource management system 404 to provide virtualize RAN resources by providing RAN resource virtualization information in the direct MVNO RAN resource management database 412 that abstracts the physical RAN resources 602a and 602b as virtualized RAN resources that the direct MVNO RAN resource management system 404 presents to the MVNO system 206a as its allocated RAN slice(s). For example, based on a subscription requested by the MVNO system (e.g., which may specify the QoS/QoE for the service being requested by the MVNO system), the InP system may either use an existing RAN slice profile that matches the requested requirements, or may create a new RAN slice profile for that MVNO system. That RAN slice profile may specify the number of RAN physical resource blocks (e.g., frequency and time dimension) that the InP system is allocating to the MVNO system for uplink and for downlink operations, and the assignment may be either static (e.g., fixed amount and locations of RAN physical resource blocks allocated to the RAN slice in that profile), or dynamic (e.g., different percentages of RAN resources may be allocated to the RAN slice and the amount and locations of RAN physical resources, which may be different depending on the network conditions). However, any change in the amount and locations of RAN physical resources in that RAN slice should always meet the QoS/QoE constraints in the request. One of skill in the art in possession of the present disclosure will appreciate how the mapping the RAN physical resource blocks into RAN slices provides a technique to visualize the physical resources into RAN slices, and thus allows the InP system to present the RAN slices to the subscribers without exposing the physical resources.

In a specific example, the virtualized RAN resources may be represented by the InP system via the InP system allocating a dedicated frequency range for the MVNO system, with a guarantee for user equipment to minimum RAN delay and wired network delay (i.e., delay from the RAN to the core network). In another specific example, the virtualized RAN resources may be represented by the InP system via the InP system guaranteeing QoS constraints for several types of data traffic, with those guarantees limited to an upper bound/amount of data traffic or a number of users. However, while two specific examples of virtualized RAN resources are described, one of skill in the art in possession of the present disclosure will appreciate how RAN resources may be virtualized in a variety of manners that will fall within the scope of the present disclosure as well.

Figure 7A:
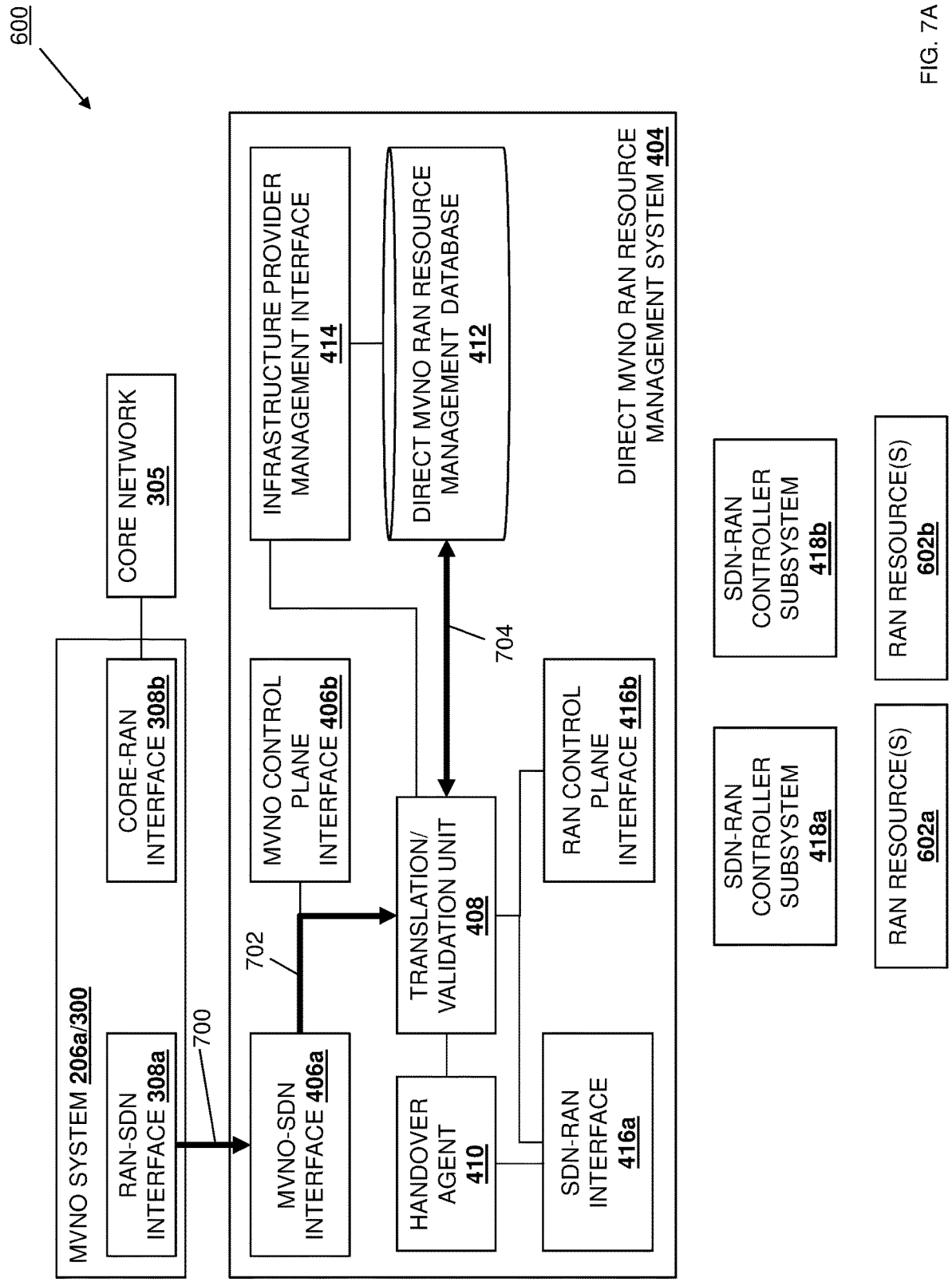
FIG. 7A is a schematic view illustrating an embodiment of the networked system of FIG. 2 operating during the method of FIG. 5.

The method 500 then proceeds to block 504 where the direct MVNO RAN resource management system receives a virtualized RAN resource command from the MVNO system. In this first example of the method blocks 504, 506, and 508 in the method 500, the MVNO system 206/300 is providing a virtualized RAN resource command to create, delete, or update a RAN slice that it provides to its vertical. With reference to FIG. 7A, in an embodiment of block 504, the MVNO engine 304 in the MVNO system 206a/300 may perform virtualized RAN resource command transmission operations 700 that may include generating and transmitting a virtualized RAN resource command and transmitting it via its RAN-SDN interface 308a such that it is received by the MVNO-SDN interface 406a in the direct MVNO RAN resource management system 404. In a specific example, the virtualized RAN resource command may include a list of RAN resource identifiers (e.g., virtual RAN resource identifiers), a list of International Mobile Subscriber Identities (IMSIs), a type of action (e.g., a RAN slice creation action, a RAN slice deletion action, or a RAN slice updating action in this example), and/or a variety of RAN resource command parameters that one of skill in the art in possession of the present disclosure would recognize as providing for the creation, deletion, or updating of a RAN slice. In response to receiving the virtualized RAN resource command, the MVNO-SDN interface 406a may operate to validate credentials provided by the MVNO system 206a, and perform virtualized RAN resource command forwarding operations 702 to forward the virtualized RAN resource command to the translation/validation unit 408.

The method 500 then proceeds to block 506 where the direct MVNO RAN resource management system automatically translates the virtualized RAN resource command to a physical RAN resource command. With continued reference to FIG. 7A, in an embodiment of block 506, the translation/validation unit 408 may receive the virtualized RAN resource command from the MVNO-SDN interface 406a and, in response, may operate to automatically translate that virtualized RAN resource command to a physical RAN resource command. For example, the translation/validation unit 408 perform virtual/physical RAN resource command translation operations 704 that include requesting and receiving a RAN resource mapping, an SDN-RAN controller subsystem mapping, and/or a variety of constraints that would be apparent to one of skill in the art in possession of the present disclosure from the direct MVNO RAN resource management database 412. The virtual/physical RAN resource command translation operations 704 may then further include the translation/validation unit 408 using the RAN resource identifiers in the virtualized RAN resource command, the SDN/RAN controller subsystem(s) identified in the SDN-RAN controller subsystem mapping, and the type of action and parameters in the virtualized RAN resource command to create the physical RAN resource command that includes physical actions that correspond to the actions requested by the MVNO system 206a for the RAN resource 602a and 602b.

As will be appreciated by one of skill in the art in possession of the present disclosure, the translation of a virtualized RAN resource command to a physical RAN resource command may depend on the type of virtualization being performed (specific examples of which are discussed above). For instance, in situations where the virtualized RAN resources are represented by the InP system via the InP system allocating a dedicated frequency range for the MVNO system with a guarantee for user equipment to minimum RAN delay and wired network delay, the MVNO system may have complete control of the RAN resource without knowing its actual underlying architecture, and the translation is relatively simple and involves validating the requested RAN resources and translating the virtual addresses provided by the MVNO system to the physical addresses in the underlying network. In situations where the virtualized RAN resources may be represented by the InP system via the InP system guaranteeing QoS constraints for several types of data traffic and with those guarantees limited to an upper bound/amount of data traffic or a number of users, the MVNO system may have pre-defined interfaces such as an interfaces to create QoS groups, interfaces to perform handovers, interfaces to add/remove/update QoS of users/groups in RAN resources and the link between RAN resources and the core network, and/or other interfaces that would be apparent to one of skill in the art in possession of the present disclosure.

Figure 7B:
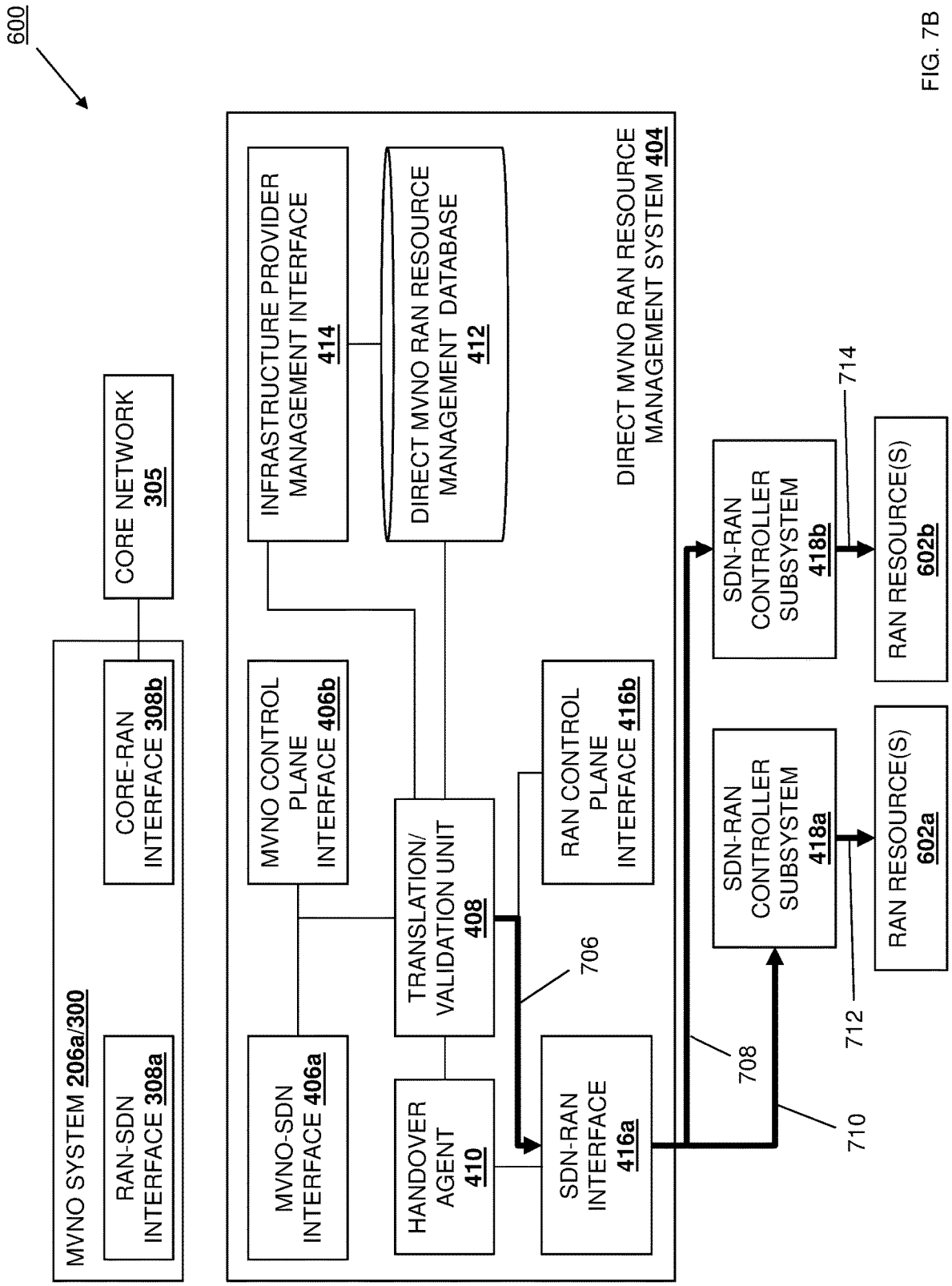
FIG. 7B is a schematic view illustrating an embodiment of the networked system of FIG. 2 operating during the method of FIG. 5.

The method 500 then proceeds to block 508 where the direct MVNO RAN resource management system automatically transmits the physical RAN resource command to cause management operation(s) associated with the portion of the physical RAN resources. With reference to FIG. 7B, in an embodiment of block 508, the translation/validation unit 408 may then perform physical RAN resource command transmission operations 706 to transmit the physical RAN resource command to the SDN-RAN interface 416a, and the SDN-RAN interface 416a may perform the required communication procedure/operations 708 and 710 (e.g., a Representation State Transfer (REST) API procedure, a customized API procedure, etc.) to transmit the physical RAN resource command to the SDN-RAN controller subsystems 418 and 418b. In response to receiving the physical RAN resource command, the SDN-RAN controller subsystems 418 and 418b may perform physical RAN resource command execution operations 712 and 714 to cause the actions included in the physical RAN resource command to be carried out with the RAN resource(s) 602a and 602b.

Figure 7C:
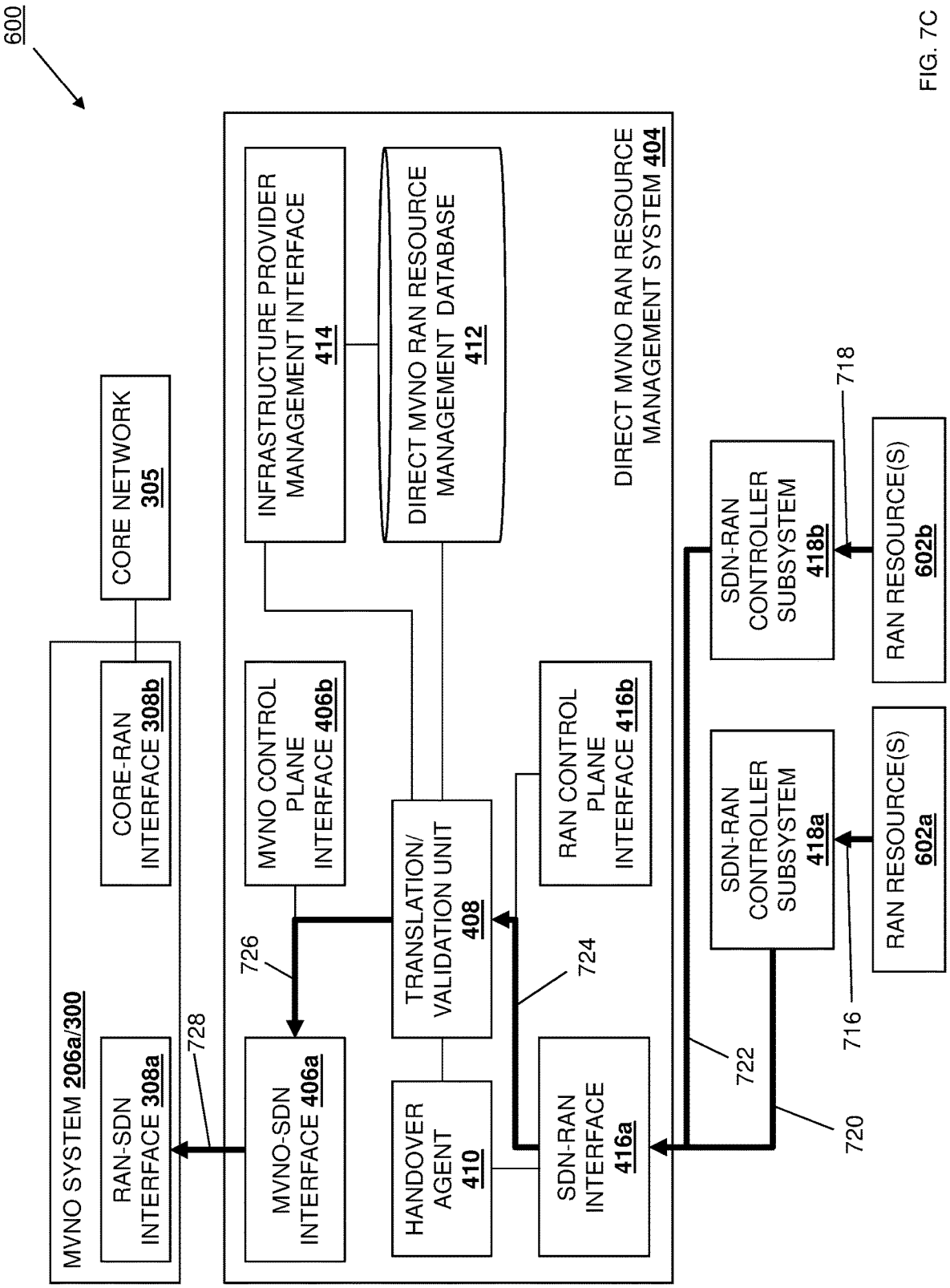
FIG. 7C is a schematic view illustrating an embodiment of the networked system of FIG. 2 operating during the method of FIG. 5.

With reference to FIG. 7C, the RAN resources 602a and 602b may then perform action confirmation transmission operations 716 and 718 to confirm that the actions directed by the SDN-RAN controller subsystems 418 and 418b have been carried out, the SDN-RAN controller subsystems 418 and 418b may perform physical RAN resource command confirmation operations 720 and 722 to confirm the performance of the physical RAN resource command with the SDN-RAN interface 416a, and the SDN-RAN interface 416a may perform physical RAN resource command confirmation operations 724 to confirm the performance of the physical RAN resource command with the translation/validation unit 408. The translation/validation unit 408 may then perform virtual RAN resource command confirmation operations 726 to confirm the performance of the virtual RAN resource command with the MVNO-SDN interface 406a, and one of skill in the art in possession of the present disclosure will appreciate how the translation/validation unit 408 may perform translations (similar to those discussed above) to translate the physical address in the underlying network to a virtual address used by the MVNO system. The MVNO-SDN interface 406a may perform virtual RAN resource command confirmation forwarding operations 728 to confirm the performance of the virtual RAN resource command with the RAN-SDN interface 308a in the MVNO system 206a/300.

Figure 8:
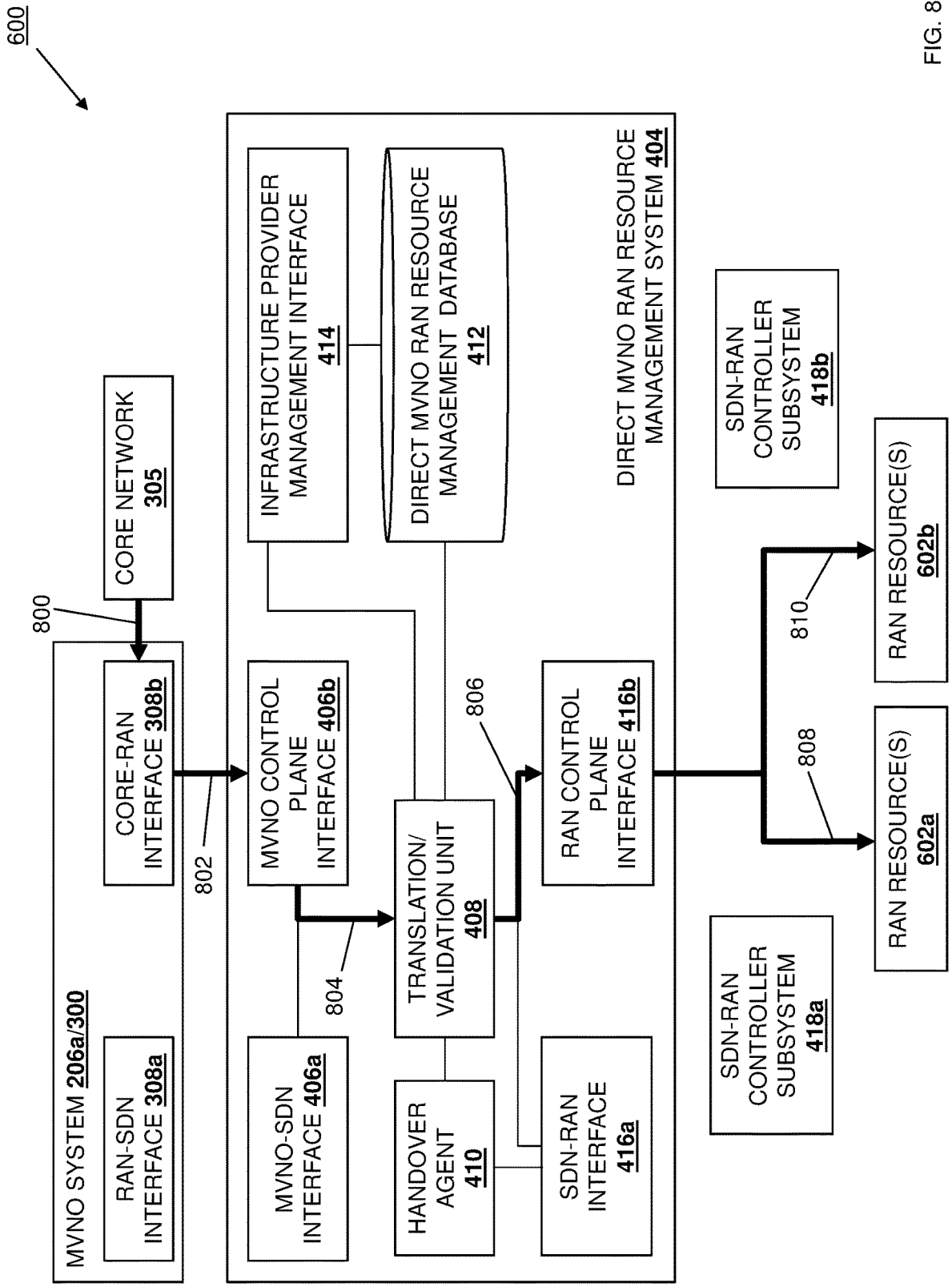
FIG. 8 is a schematic view illustrating an embodiment of the networked system of FIG. 2 operating during the method of FIG. 5.

With reference to FIG. 8, in a second example of the method blocks 504, 506, and 508, the MVNO is providing a virtualized RAN resource control communication to a RAN slice. With reference to FIG. 8, in an embodiment of block 504, the core network 305 may perform virtualized RAN resource control communication transmission operations 800 that may include generating and transmitting a virtualized RAN resource control communication and transmitting it to the core-RAN interface 308b in the MVNO system 206a/300. In a specific example, the virtualized RAN resource control communication may include address control information, Radio Resource Control (RRC) connection establishment information, configuration update information, User Equipment context modification information (e.g., between a mobility Management Entity (MME) and an eNode B (eNB) in 4G, and between an Access and Mobility Management Entity (AMF) and a gNodeB (gNB)/next generation eNB (ng-eNB) in 5G), and/or a variety of control information known in the art. In response to receiving the virtualized RAN resource control communication, the core-RAN interface 308b may perform virtualized RAN resource control communication transmission operations 802 to transmit the virtualized RAN resource control communication to the MVNO control plane interface 406b, which may then may operate to validate credentials provided by the MVNO system 206a, and perform virtualized RAN resource control communication forwarding operations 802 to forward the virtualized RAN resource control communication to the translation/validation unit 408.

The method 500 then proceeds to block 506 where the direct MVNO RAN resource management system automatically translates the virtualized RAN resource control communication to a physical RAN resource control communication. With continued reference to FIG. 8, in an embodiment of block 506, the translation/validation unit 408 may receive the virtualized RAN resource control communication from the MVNO control plane interface 406b and, in response, may operate to automatically translate that virtualized RAN resource control communication to a physical RAN resource control communication. For example, the translation/validation unit 408 perform virtual/physical RAN resource control communication translation operations that include replacing a virtual address in the message from the MVNO system with the physical/underlying addresses of eNB/gNB (in this context, the MVNO system is not aware of the type of underlying RAN (e.g., physical RAN (PHY RAN), virtual RAN (vRAN), Centralized RAN (C-RAN), or Open RAN (O-RAN)) to hide the underlying infrastructure of the InP system The method 500 then proceeds to block 508 where the direct MVNO RAN resource management system automatically transmits the physical RAN resource control communication to cause management operation(s) associated with the portion of the physical RAN resources. With continued reference to FIG. 8, in an embodiment of block 508, the translation/validation unit 408 may then perform physical RAN resource control communication transmission operations 806 to transmit the physical RAN resource control communication to the RAN control plane interface 416b, and the RAN control plane interface 416b may perform control operations 808 and 810 to cause the control operations included in the physical RAN resource control communications to be carried out with the RAN resource(s) 602a and 602b.

Figure 9A:
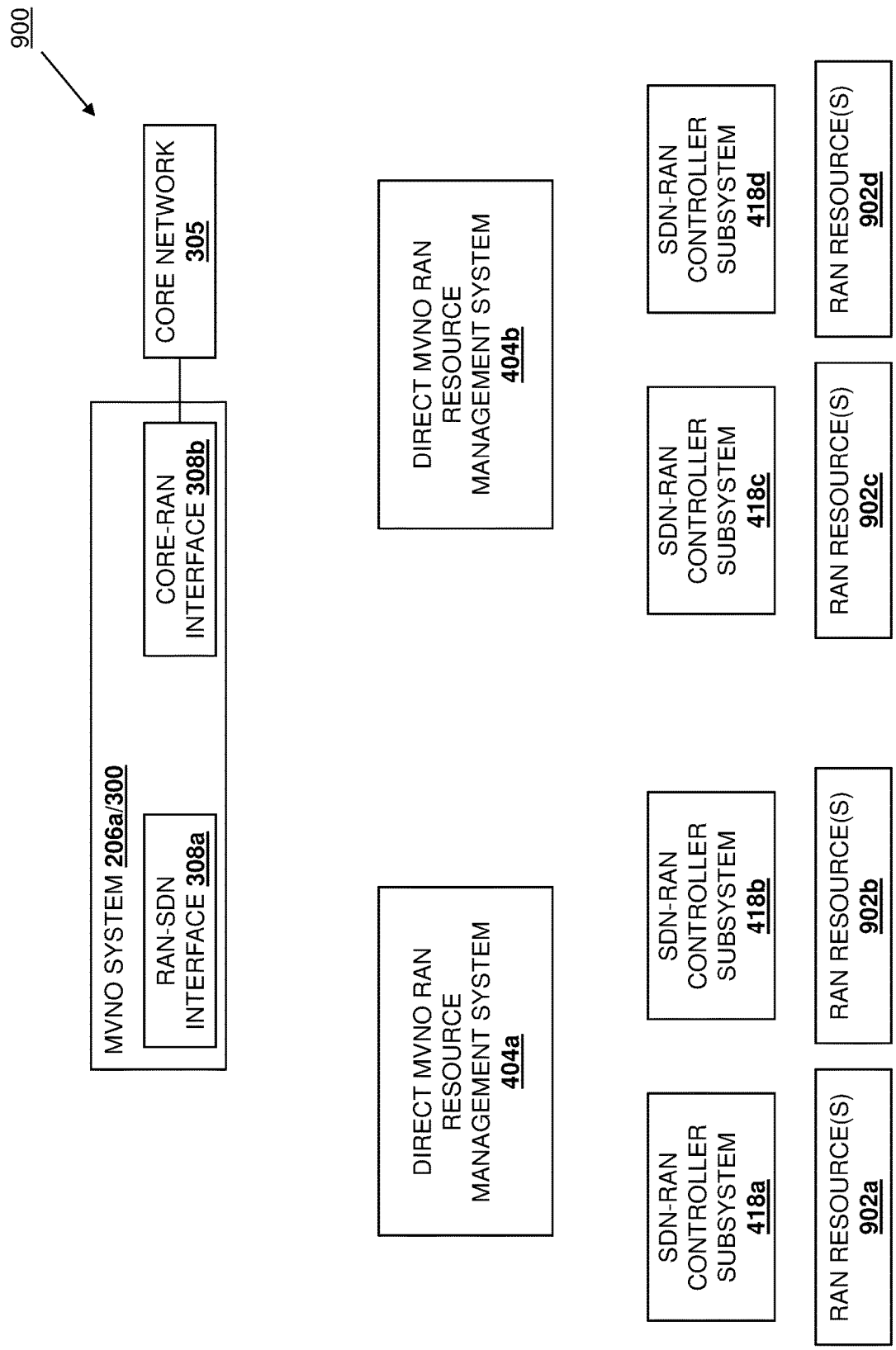
FIG. 9A is a schematic view illustrating an embodiment of the networked system of FIG. 2 operating during the method of FIG. 5.

With reference to FIGS. 9A-9J, in a third example of the method blocks 504, 506, and 508, the MVNO is providing a virtualized RAN resource command to perform a handover operation to move user equipment (e.g., a mobile phone) from an existing RAN resource to a new RAN resource. For example, when RAN slices are active and/or in an operational mode and signal degradation associated with user equipment occurs (e.g., due to mobility, density, or a RAN resource fault), handover operations may be performed to move the user equipment to a new RAN slice with guaranteed performance. With reference to FIG. 9A, an embodiment 900 of the networked system 200 describe above with reference to FIG. 2 is illustrated that includes the MVNO system 206a/300, a direct MVNO RAN resource management system 404a and SDN-RAN controller subsystems 418a and 418b (provided by a first InP system 204/400), a direct MVNO RAN resource management system 404b and SDN-RAN controller subsystems 418c and 418d (provided by a second InP system 204/400), physical RAN resource(s) 902a and 902b managed by the direct MVNO RAN resource management system 404a and its SDN controller subsystems 418a and 418b, and physical RAN resource(s) 902c and 902d managed by the direct MVNO RAN resource management system 404b and its SDN controller subsystems 418c and 418d.

Figure 9B:
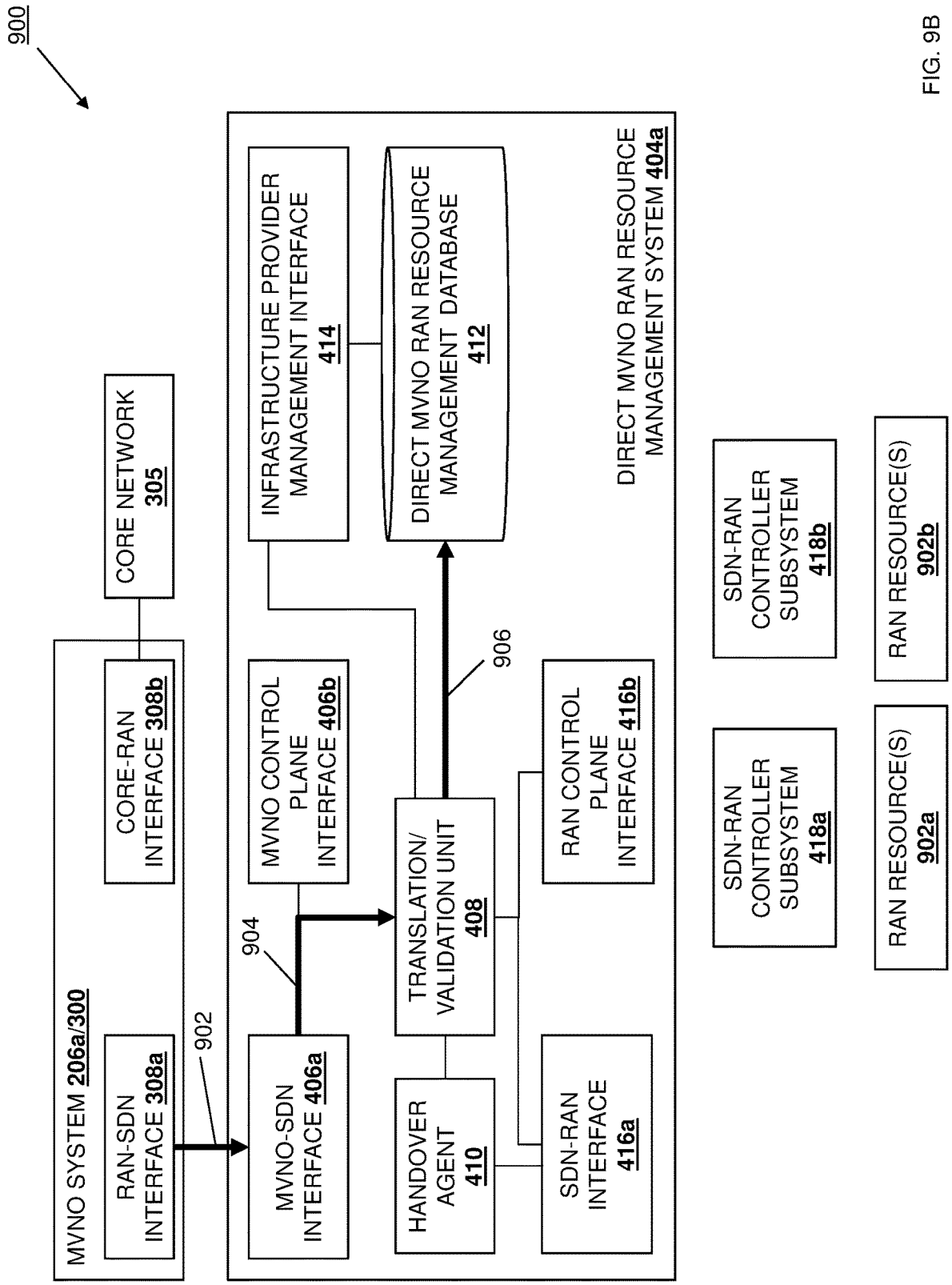
FIG. 9B is a schematic view illustrating an embodiment of the networked system of FIG. 2 operating during the method of FIG. 5.

With reference to FIG. 9B, in an embodiment of block 504, the MVNO engine 304 in the MVNO system 206a/300 may perform virtualized RAN resource command transmission operations 902 that may include generating and transmitting a virtualized RAN resource command and transmitting it via its RAN-SDN interface 308a such that it is received by the MVNO-SDN interface 406a in the direct MVNO RAN resource management system 404. In a specific example, the virtualized RAN resource command may include a source RAN cell identifier, a target RAN cell identifier, an IMSI, an endpoint identifier, and credentials to communicate with the handover agent 410 in the direct MVNO RAN resource management system 404b.

In a specific example and as will be appreciated by one of skill in the art in possession of the present disclosure, user equipment may report measurements of neighboring cells (to the MME in 4G/LTE, and to the AMF in 5G), and those measurements may be used to make decisions about when and how to perform the handover. For example, report measurements from user equipment showing signal degradation from a current serving cell to that user equipment, but showing strong reception from other neighboring cells may trigger the handover. The direct MVNO RAN resource management system provides the MVNO system direct control over its RAN resources including the user equipment reporting, allowing the MVNO system to control the handover trigger, as well as make its own decision about the target RAN resources to use for the handover, and the handover commands may reference the current source virtualized RAN resources and corresponding target virtualized RAN resources, both of which may be allocated to the MVNO system to enable the handover. In response to receiving the virtualized RAN resource command, the MVNO-SDN interface 406a may operate to validate credentials provided by the MVNO system 206a, and perform virtualized RAN resource command forwarding operations 904 to forward the virtualized RAN resource command to the translation/validation unit 408.

Figure 9C:
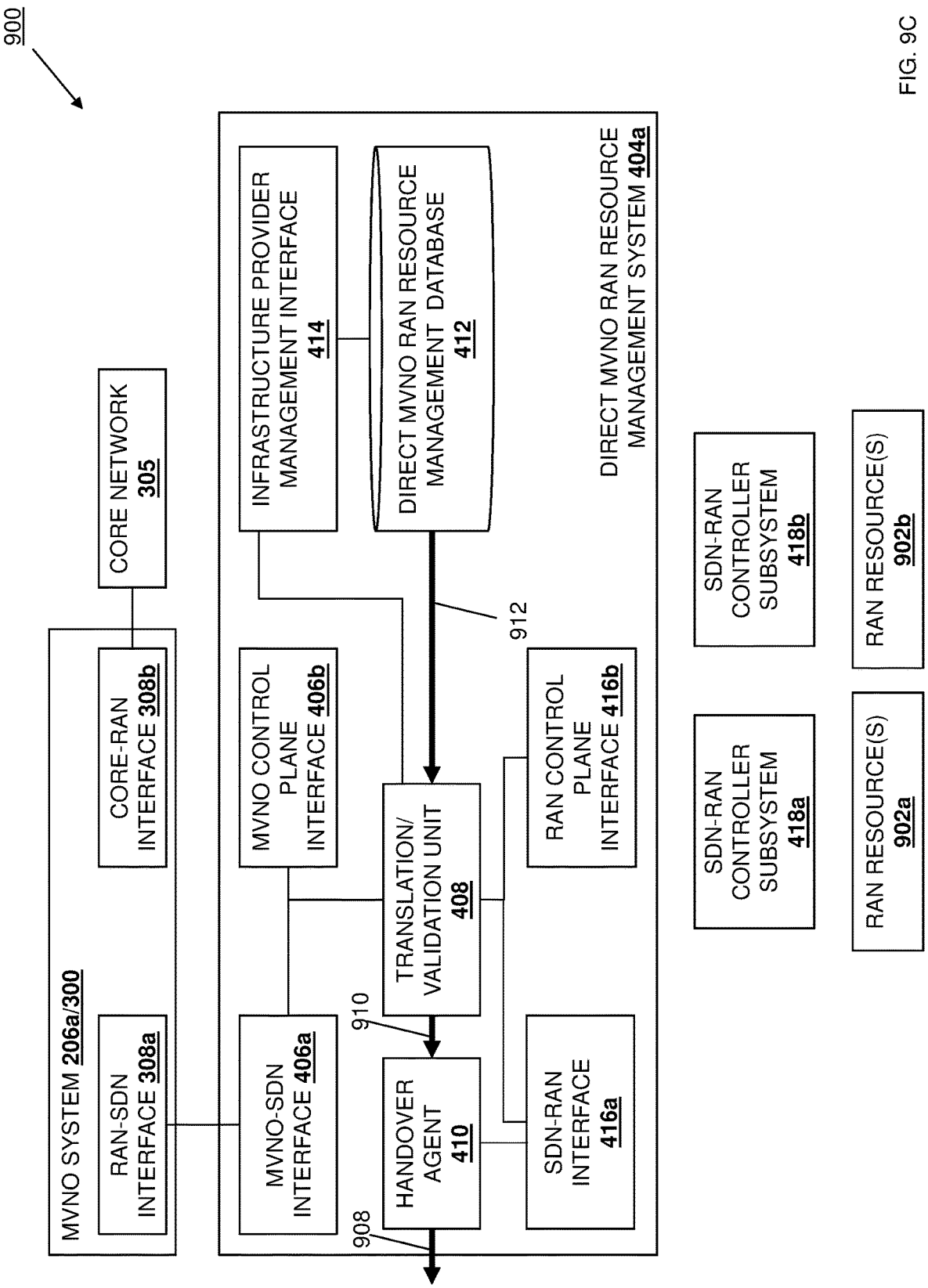
FIG. 9C is a schematic view illustrating an embodiment of the networked system of FIG. 2 operating during the method of FIG. 5.

The method 500 then proceeds to block 506 where the direct MVNO RAN resource management system automatically translates the virtualized RAN resource command to a physical RAN resource command. With reference to FIGS. 9B and 9C, in an embodiment of block 506, the translation/validation unit 408 may receive the virtualized RAN resource command from the MVNO-SDN interface 406a and, in response, may operate to automatically translate that virtualized RAN resource command to a physical RAN resource command. For example, the translation/validation unit 408 may perform virtual/physical RAN resource command translation and validation operations 906 and 908 that include requesting and receiving a RAN resource mapping, an SDN-RAN controller subsystem mapping, and/or a variety of constraints that would be apparent to one of skill in the art in possession of the present disclosure from the direct MVNO RAN resource management database 412. The virtual/physical RAN resource command translation/validation operations 906 and 908 may then further include the translation/validation unit 408 determining that the virtualized RAN resource command is valid, and generating a physical RAN resource command that includes the source RAN cell identifier, the target RAN cell identifier, the IMSI, and a target handover agent identifier for the handover agent 410 in the direct MVNO RAN resource management system 404b. As will be appreciated by one of skill in the art in possession of the present disclosure, the translation/validation unit 408 may perform translation operations (similar to those discussed above) to translate the virtualized RAN resource addresses to the physical RAN resource addresses as part of the virtual/physical RAN resource command translation/validation operations 906 and 908.

Figure 9D:
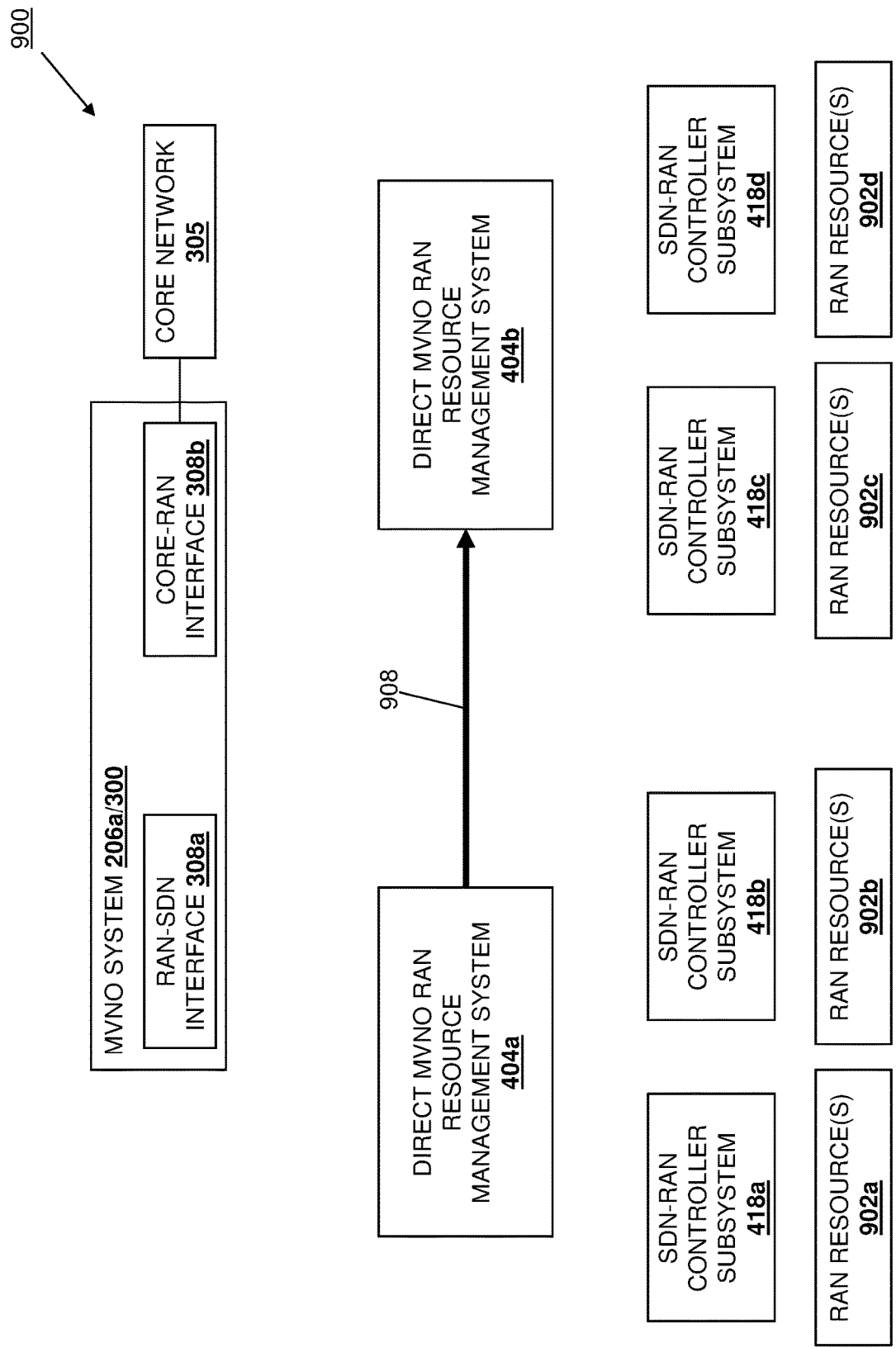
FIG. 9D is a schematic view illustrating an embodiment of the networked system of FIG. 2 operating during the method of FIG. 5.
Figure 9E:
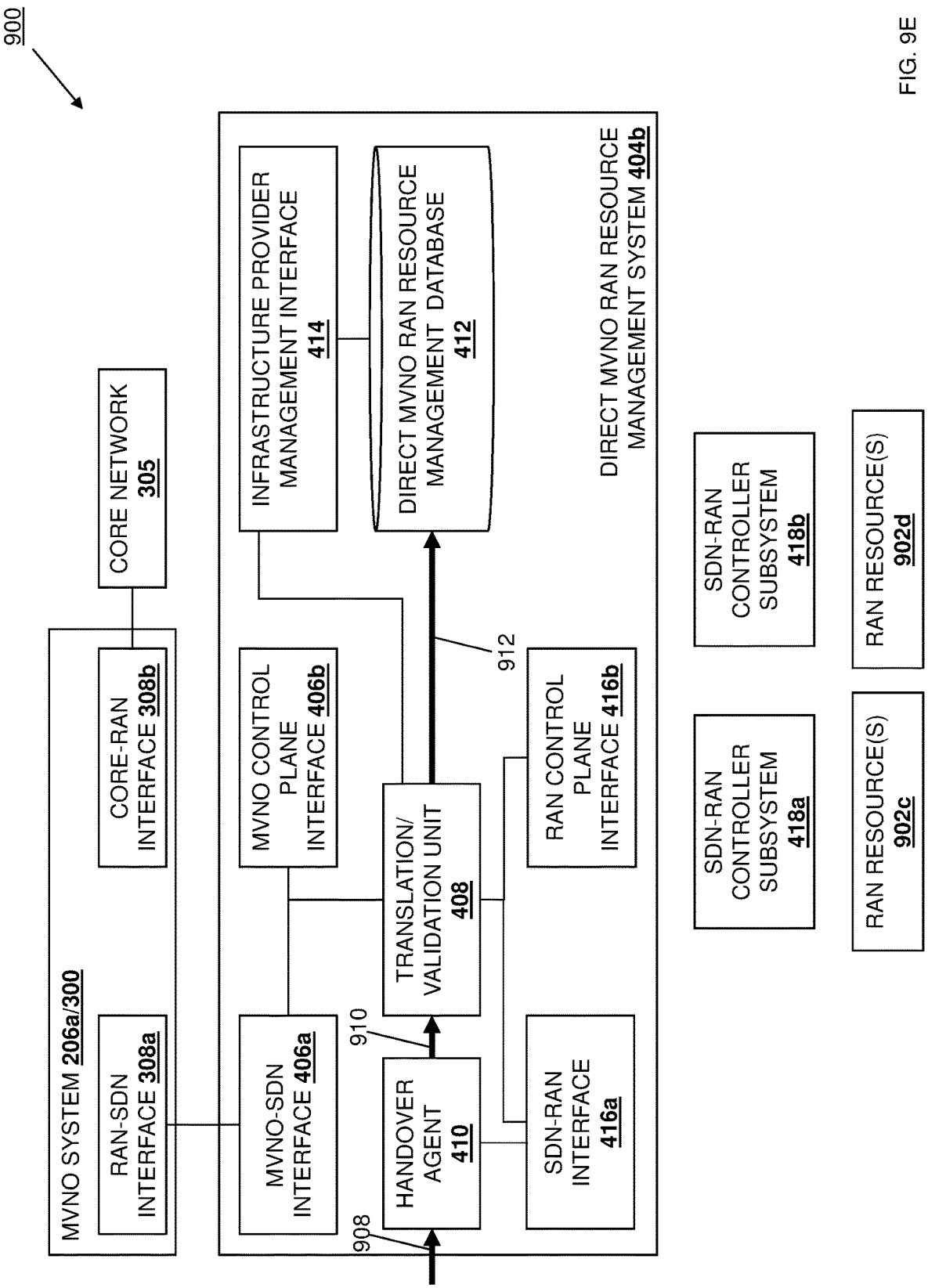
FIG. 9E is a schematic view illustrating an embodiment of the networked system of FIG. 2 operating during the method of FIG. 5.

The method 500 then proceeds to block 508 where the direct MVNO RAN resource management system automatically transmits the physical RAN resource command to cause management operation(s) associated with the portion of the physical RAN resources. With continued reference to FIG. 9C, in an embodiment of block 508, the translation/validation unit 408 may then perform physical RAN resource command transmission operations 910 to transmit the physical RAN resource command to the handover agent 410 in the direct MVNO RAN resource management system 404a. With reference to FIGS. 9C, 9D, and 9E, in response to receiving the physical RAN resource command, the handover agent 410 in the direct MVNO RAN resource management system 404a may perform physical RAN resource command transmission operations 908 to transmit the physical RAN resource command to the handover agent 410 in the direct MVNO RAN resource management system 404b.

Figure 9F:
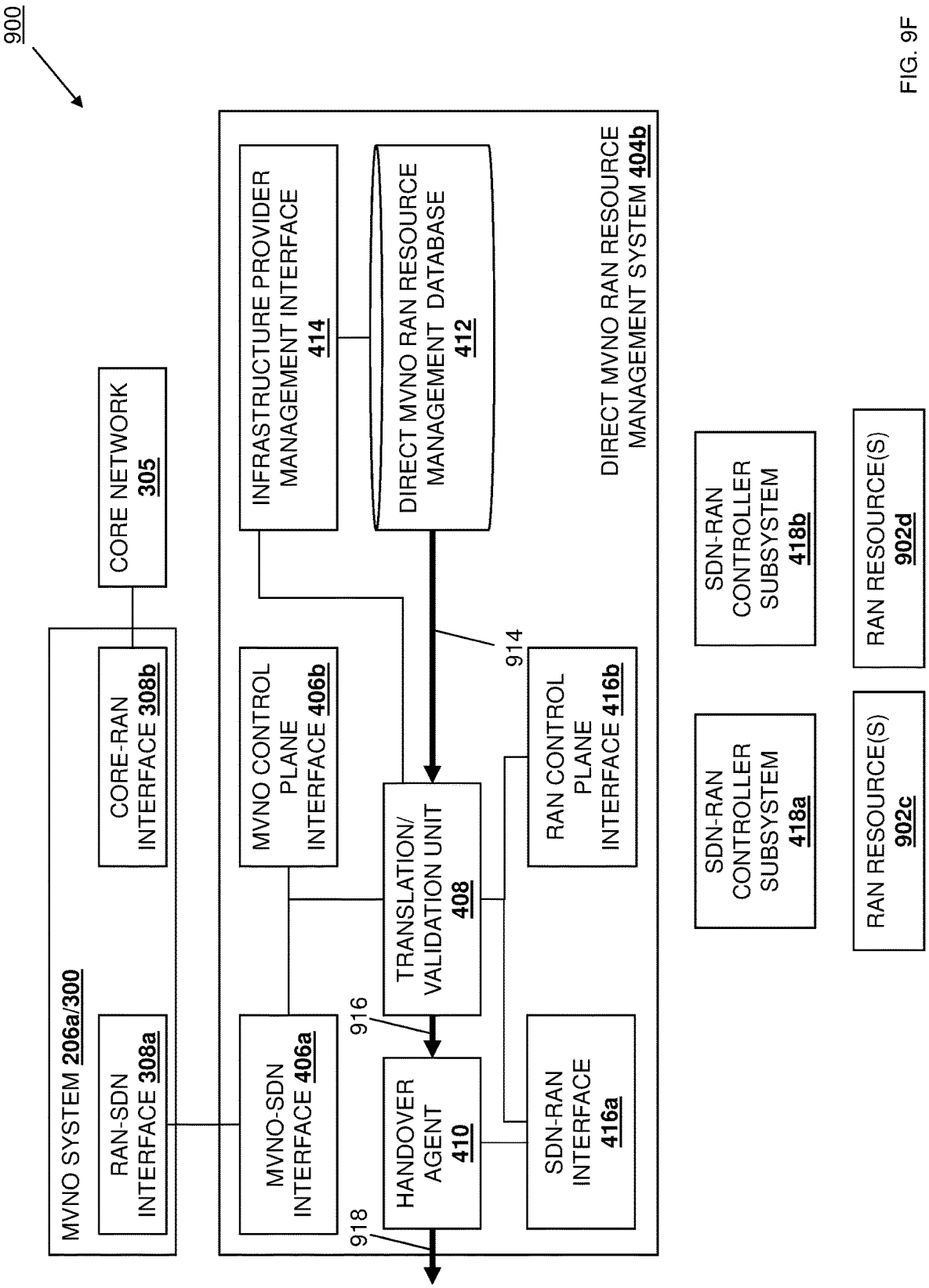
FIG. 9F is a schematic view illustrating an embodiment of the networked system of FIG. 2 operating during the method of FIG. 5.

With reference to FIG. 9E, in response to receiving the physical RAN resource command, the handover agent 410 in the direct MVNO RAN resource management system 404b may perform physical RAN resource command forwarding operations 410 that include forwarding the physical RAN resource command to the translation/validation unit 408. With reference to FIGS. 9E and 9F, in response to receiving the physical RAN resource command, the translation/validation unit 408 performs physical RAN resource request translation/validation operations 912 and 914 to request and receive a RAN resource mapping, an SDN-RAN controller subsystem mapping, and/or a variety of constraints that would be apparent to one of skill in the art in possession of the present disclosure from the direct MVNO RAN resource management database 412. The virtual/physical RAN resource command validation operations 912 and 914 may then further include the translation/validation unit 408 determining that the virtualized RAN resource command is valid, and generating a physical RAN resource command acceptance. As will be appreciated by one of skill in the art in possession of the present disclosure, the translation/validation unit 408 may perform translation operations (similar to those discussed above) to translate the virtualized RAN resource addresses to the physical RAN resource addresses as part of the virtual/physical RAN resource command validation operations 912 and 914.

Figure 9G:
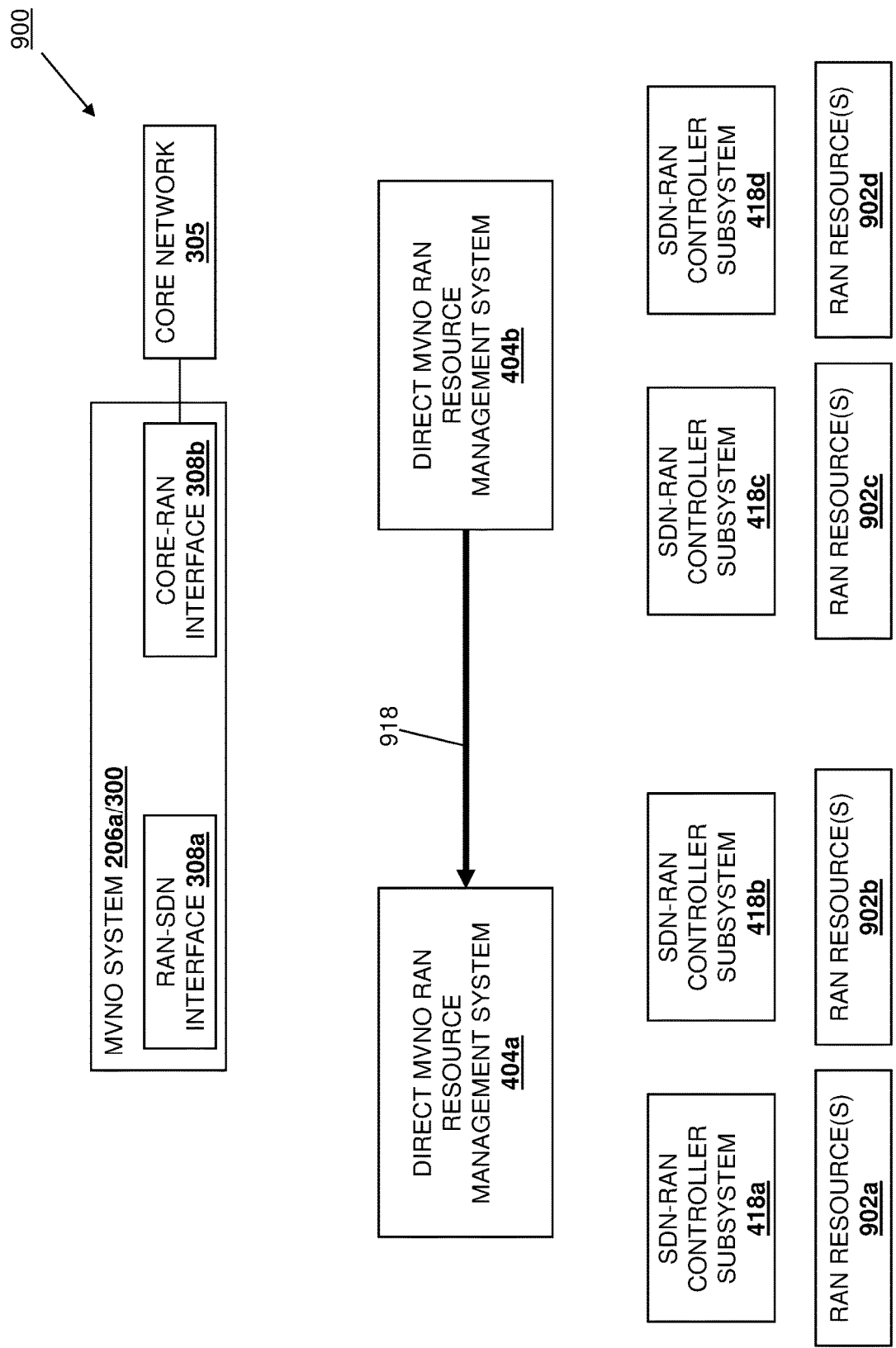
FIG. 9G is a schematic view illustrating an embodiment of the networked system of FIG. 2 operating during the method of FIG. 5.
Figure 9H:
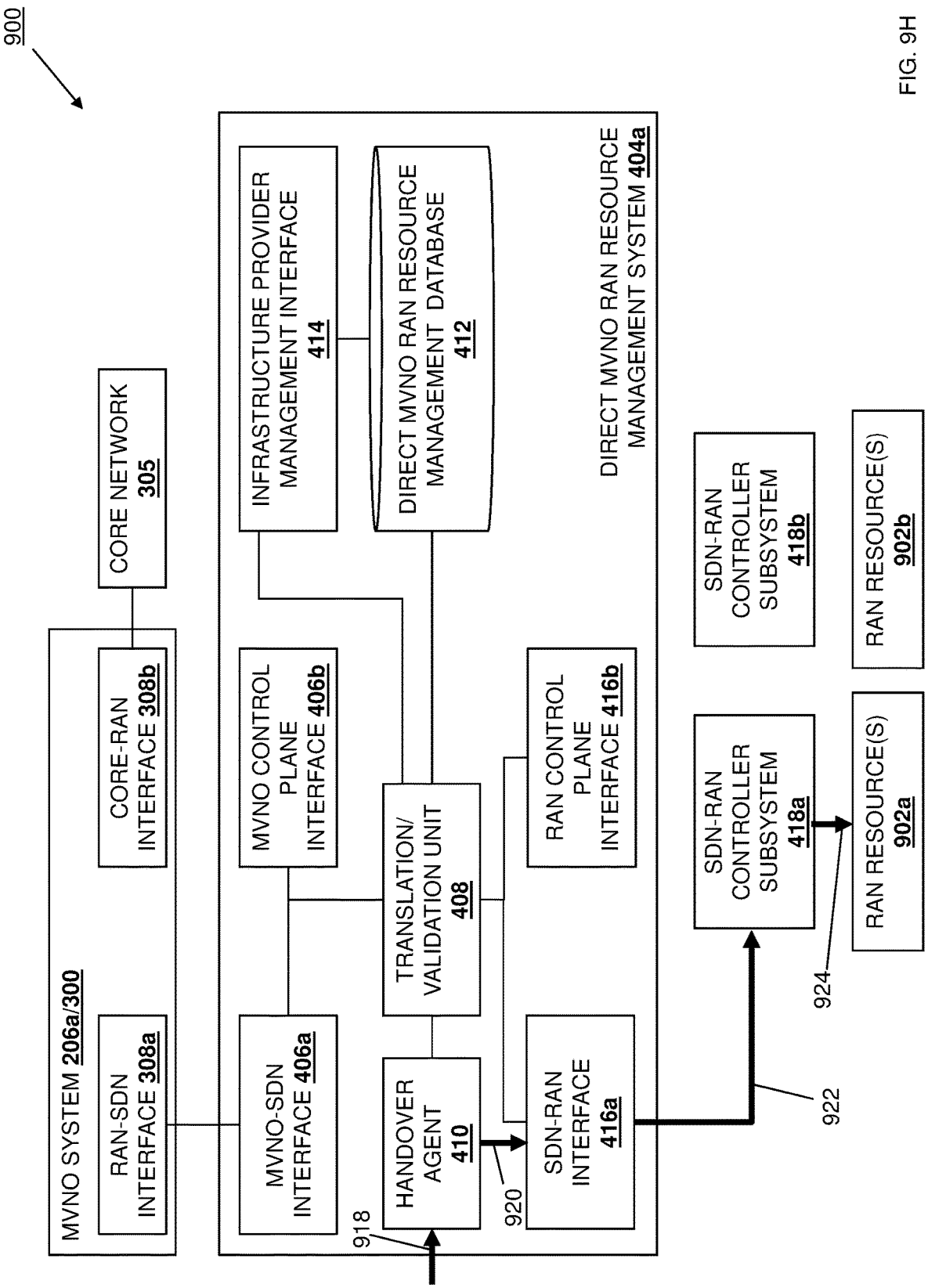
FIG. 9H is a schematic view illustrating an embodiment of the networked system of FIG. 2 operating during the method of FIG. 5.

With continued reference to FIG. 9F, in an embodiment of block 508, the translation/validation unit 408 may then perform physical RAN resource command acceptance transmission operations 916 to transmit the physical RAN resource command acceptance to the handover agent 410 in the direct MVNO RAN resource management system 404b. With reference to FIGS. 9F, 9G, and 9H, in response to receiving the physical RAN resource command acceptance, the handover agent 410 in the direct MVNO RAN resource management system 404b may perform physical RAN resource command acceptance transmission operations 918 to transmit the physical RAN resource command acceptance to the handover agent 410 in the direct MVNO RAN resource management system 404a. Continuing with reference to FIG. 9H, in response to receiving the physical RAN resource command acceptance, the handover agent 410 in the direct MVNO RAN resource management system 404a may perform handover parameter transmission operations 920 to pass handover parameters included in the physical RAN resource command acceptance to the SDN-RAN interface 416a.

Figure 9I:
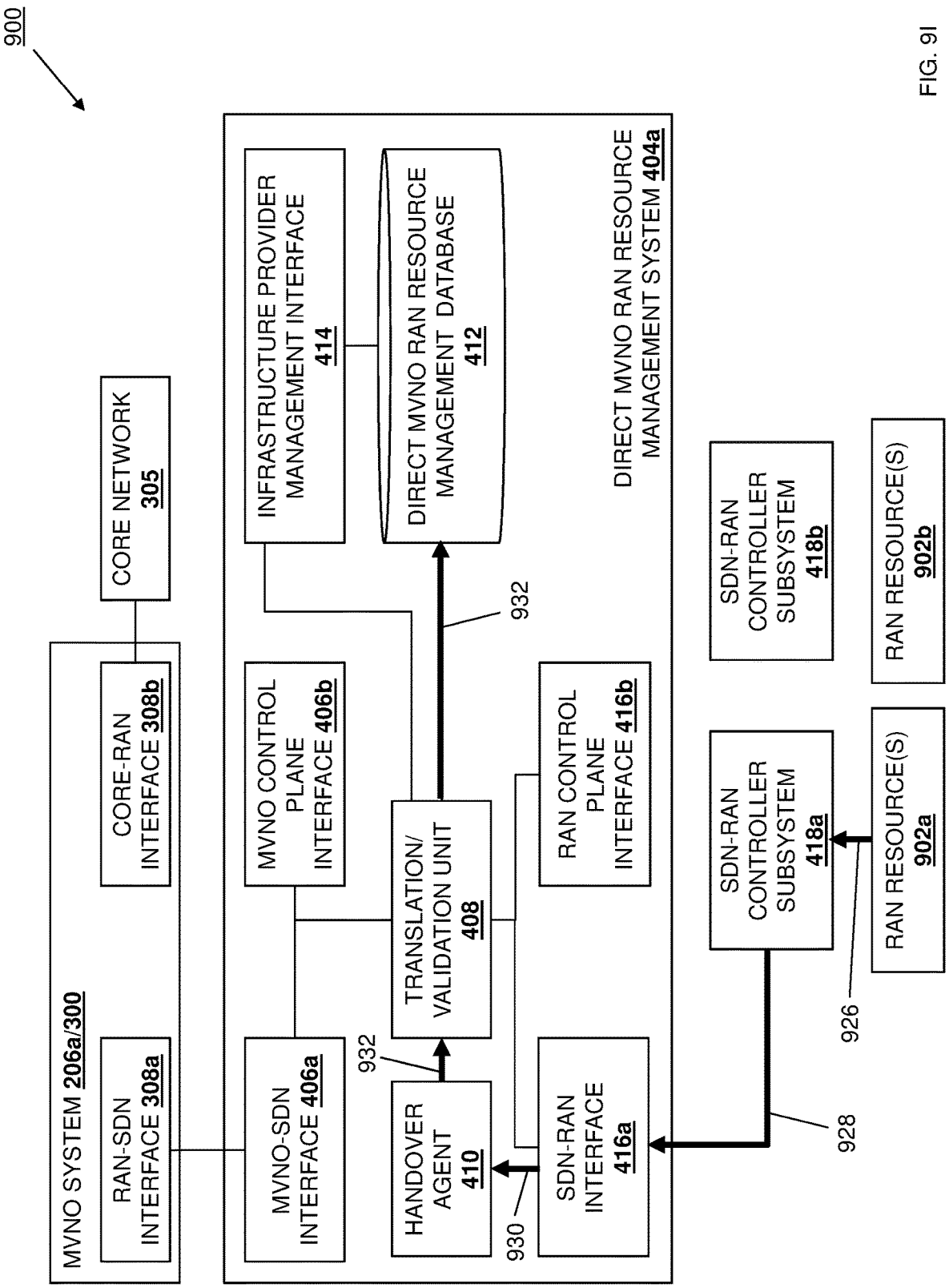
FIG. 9I is a schematic view illustrating an embodiment of the networked system of FIG. 2 operating during the method of FIG. 5.

With reference to FIG. 9H, in response to receiving the handover parameters, the SDN-RAN interface 416a may perform the required communication procedure/operations 922 (e.g., a Representation State Transfer (REST) API procedure, a customized API procedure, etc.) to request the handover operations from the SDN-RAN controller subsystems 418a. In response to receiving the request for handover operations, the SDN-RAN controller subsystem 418a may perform handover command execution operations 924 to cause the handover to be carried out with the RAN resource(s) 902a. With reference to FIG. 9I, in response to carrying out the handover, the RAN resource(s) 902a may perform handover confirmation operations 926 to confirm the handover operations with the SDN-RAN controller subsystem 418a, and in response to receiving the handover confirmation, the SDN-RAN controller subsystem 418a may perform handover confirmation operations 928 to confirm the handover with the SDN-RAN interface 416a.

Figure 9J:
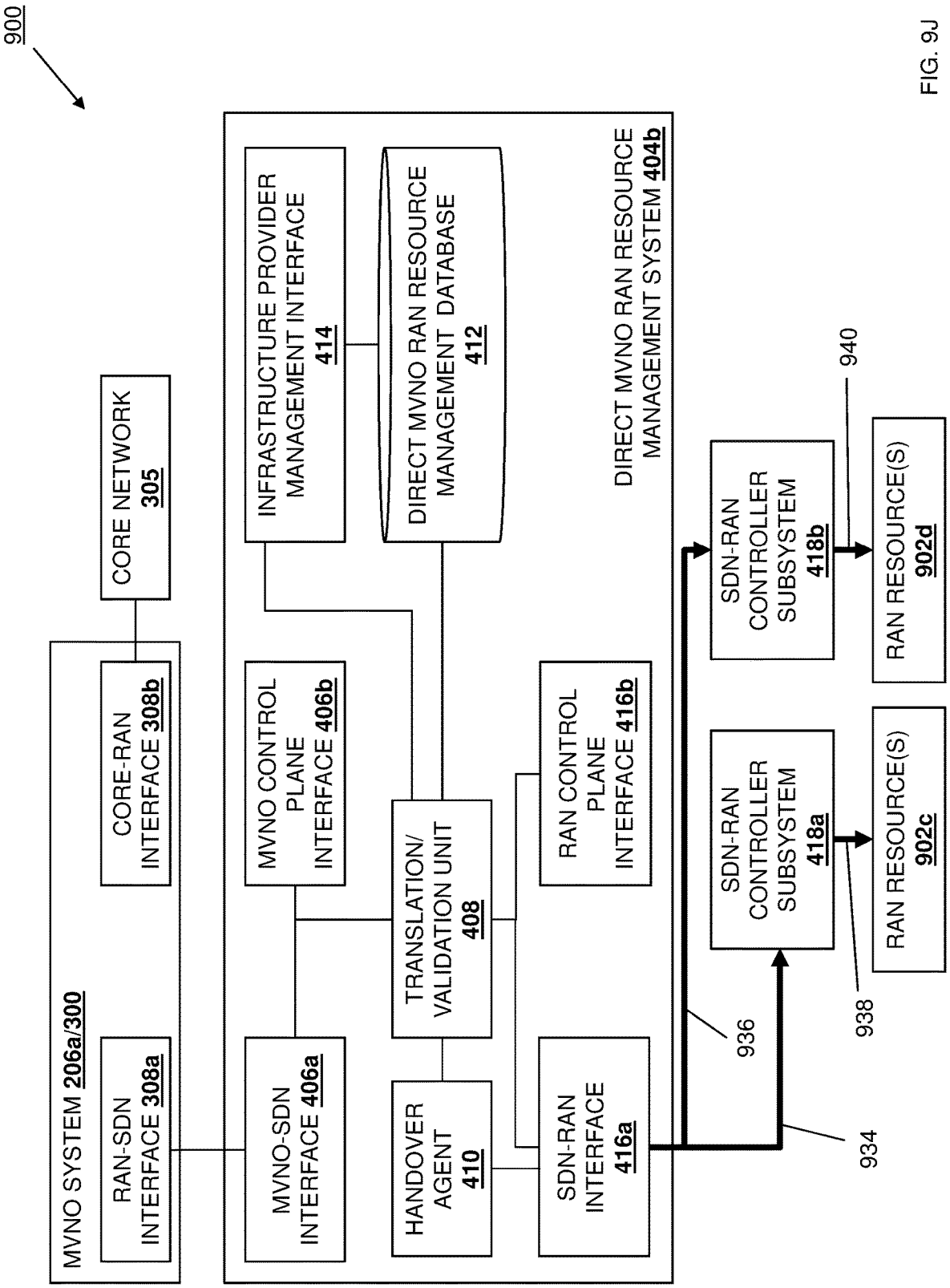
FIG. 9J is a schematic view illustrating an embodiment of the networked system of FIG. 2 operating during the method of FIG. 5.

In response to receiving the handover confirmation, the SDN-RAN interface 416a may perform handover confirmation operations 928 to confirm the handover with the handover agent 410 in the direct MVNO RAN resource management system 404a, and the handover agent 410 may perform database update operations 932 to update the direct MVNO RAN resource management database 412 to remove identifiers for the user equipment that was handed over. With reference to FIG. 9J, the SDN-RAN interface 416a in the direct MVNO RAN resource management system 404b may then perform the required communication procedure/operations 936 and 938 (e.g., a Representation State Transfer (REST) API procedure, a customized API procedure, etc.) to transmit a handover command to the SDN-RAN controller subsystems 418 and 418b. In response to receiving the handover command, the SDN-RAN controller subsystems 418a and 418b may perform handover command execution operations 938 and 940 to complete the handover of the user equipment from the RAN resource(s) 902a to the RAN resource(s) 902c and 902d, and one of skill in the art in possession of the present disclosure will appreciate how those handover operations may follow handover procedures currently utilized with 4G or 5G networks.

Figure 10:
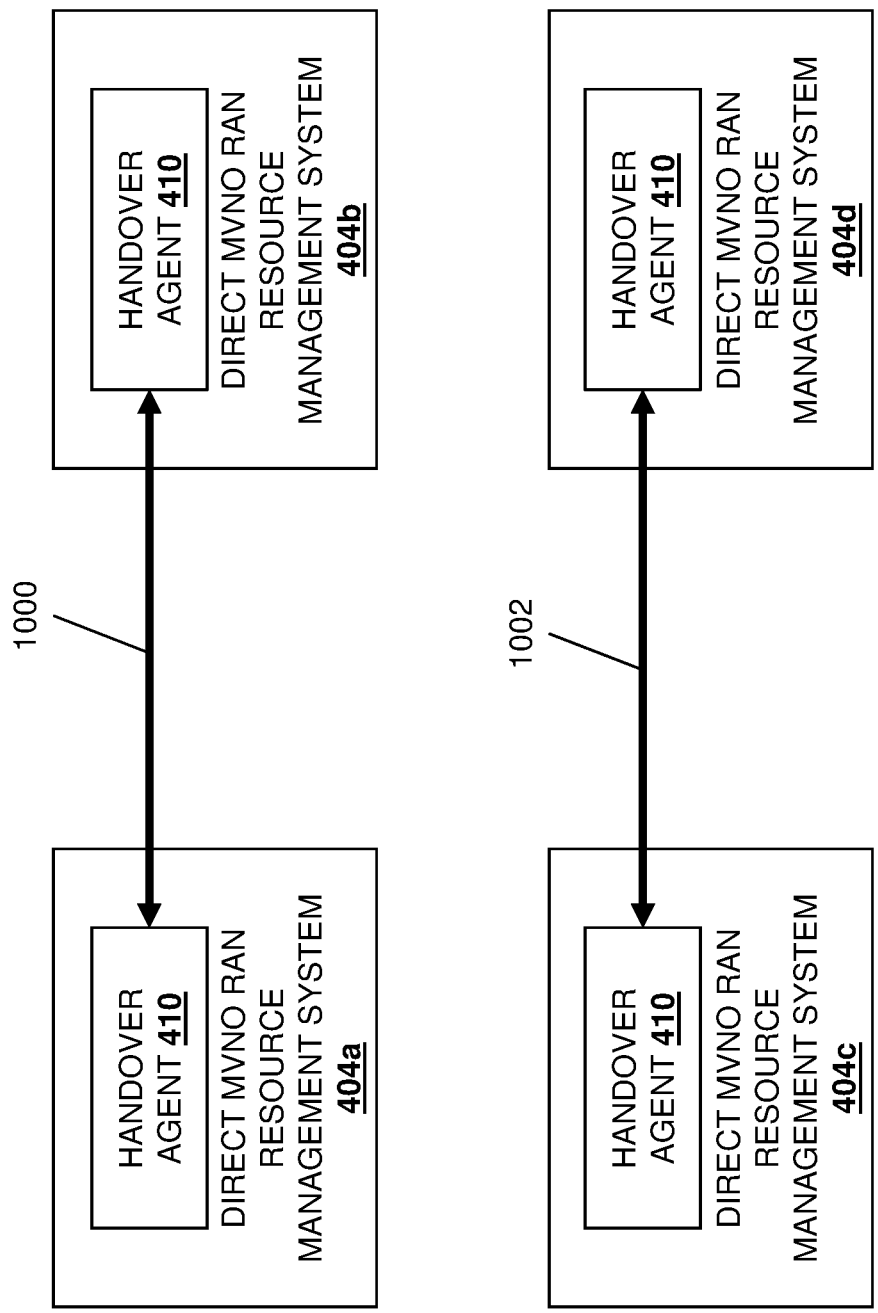
FIG. 10 is a schematic view illustrating an embodiment of the networked system of FIG. 2 operating during the method of FIG. 5.

Referring now to FIG. 10, an embodiment is illustrated of different direct MVNO RAN resource management systems 404a, 404b, 404c, and 404d that are each provided by a different InP system for the same MVNO system. As discussed above, the handover agents 410 in the direct MVNO RAN resource management systems 404a, 404b, 404c, and 404d operate to manage SDN handovers (e.g., X2-SDN handovers, S1-SDN handovers, etc.), with the respective InP systems having provided the MVNO system with respective lists of relevant X2 links for RAN resources allocated for that MVNO system. As discussed above, for scalability purposes the multiple direct MVNO RAN resource management systems 404a, 404b, 404c, and 404d may be provided for the MVNO system, and the handover agents 410 in the direct MVNO RAN resource management systems 404a, 404b, 404c, and 404d may communicate to organize user equipment handovers between RAN-SDN controller subsystems that share RAN resources connected with X2 links.

For example, FIG. 10 illustrates the handover agent 410 in the direct MVNO RAN resource management system 404a performing handover operations 1000 with the handover agent 410 in the direct MVNO RAN resource management system 404b to handover user equipment associated with the MVNO system from RAN resources controlled by the RAN-SDN controller subsystem associated with the direct MVNO RAN resource management system 404a to the RAN-SDN controller subsystem associated with the direct MVNO RAN resource management system 404b, which may be performed similarly as described above with reference to FIGS. 9A-9J. Similarly, FIG. 10 also illustrates the handover agent 410 in the direct MVNO RAN resource management system 404c performing handover operations 1002 with the handover agent 410 in the direct MVNO RAN resource management system 404d to handover user equipment associated with the MVNO system from RAN resources controlled by the RAN-SDN controller subsystem associated with the direct MVNO RAN resource management system 404c to the RAN-SDN controller subsystem associated with the direct MVNO RAN resource management system 404d, which may be performed similarly as described above with reference to FIGS. 9A-9J.

Figure 11:
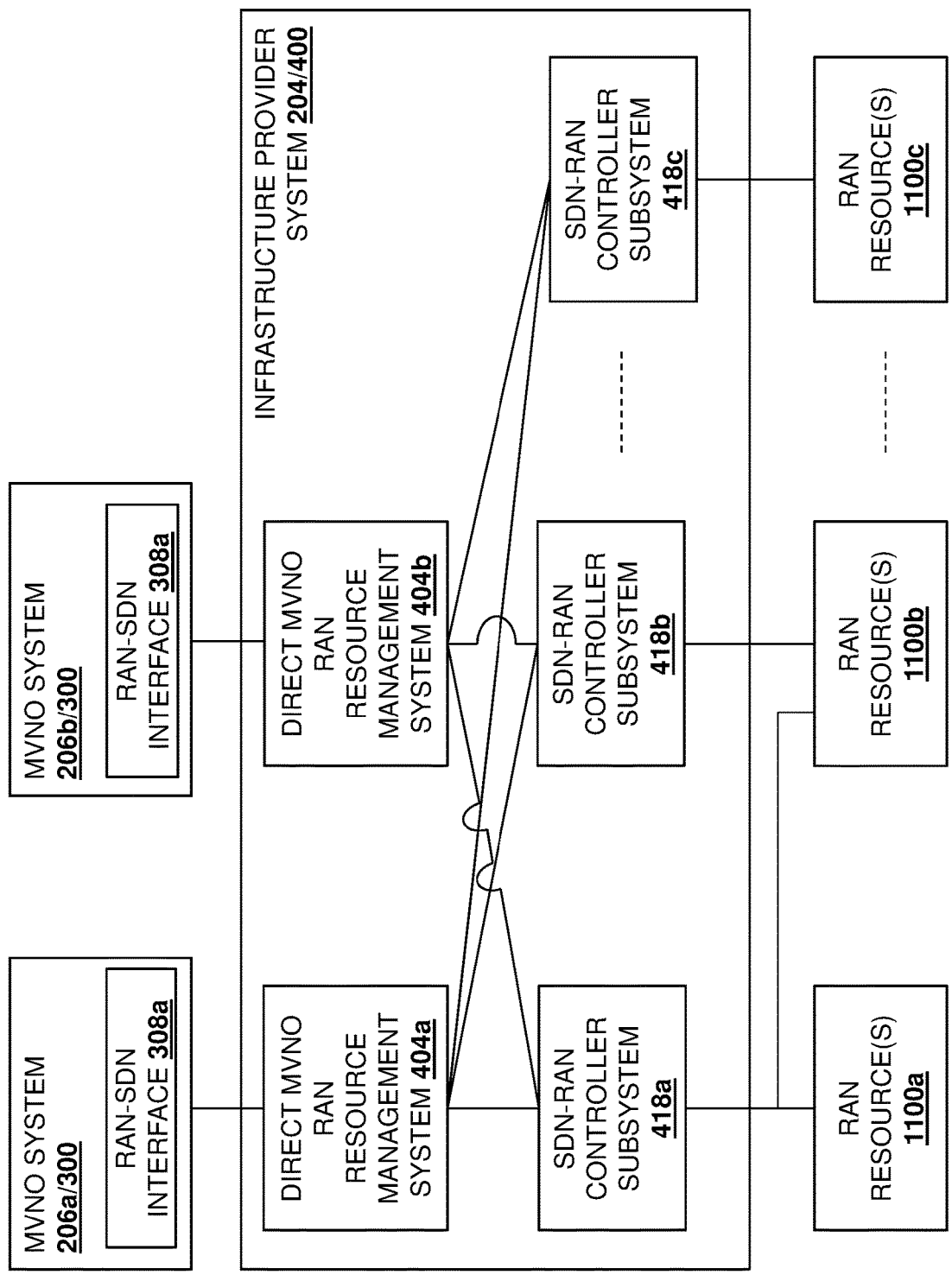
FIG. 11 is a schematic view illustrating an embodiment of the networked system of FIG. 2 operating during the method of FIG. 5.

With reference to FIG. 11, an embodiment of the present disclosure is illustrated to provide an example of how an InP system 204/400 may provide respective direct MVNO RAN resource management systems 404a and 404b to respective MVNO systems 206a/300 and 206b/300 (i.e., a "multi-tenant" RAN-SDN architecture), with the InP system 204/400 including SDN-RAN controller subsystems 418a, 418b, and up to 418c that control access to respective RAN resource(s) 1100a, 1100b, and up to 1100c (with the RAN resource(s) 1100a-1100c including a portion of the RAN resource(s) 202a-202b that have been allocated to the MVNO systems 206a/300 and 206b/300). As will be appreciated by one of skill in the art in possession of the present disclosure, the multiple respective direct MVNO RAN resource management systems 404a and 404b connect to the SDN-RAN controller subsystems 418a-418c in the InP system 204/400, and conflicts between the MVNO systems 206a/300 and 206b/300 may be prevented by the translation/validation units 408 in the direct MVNO RAN resource management systems 404a and 404b, thus ensuring that an SDN request from one of the MVNO systems 206a/300 and 206b/300 is only applied on RAN resources that are reserved for that MVNO system.

Figure 12:
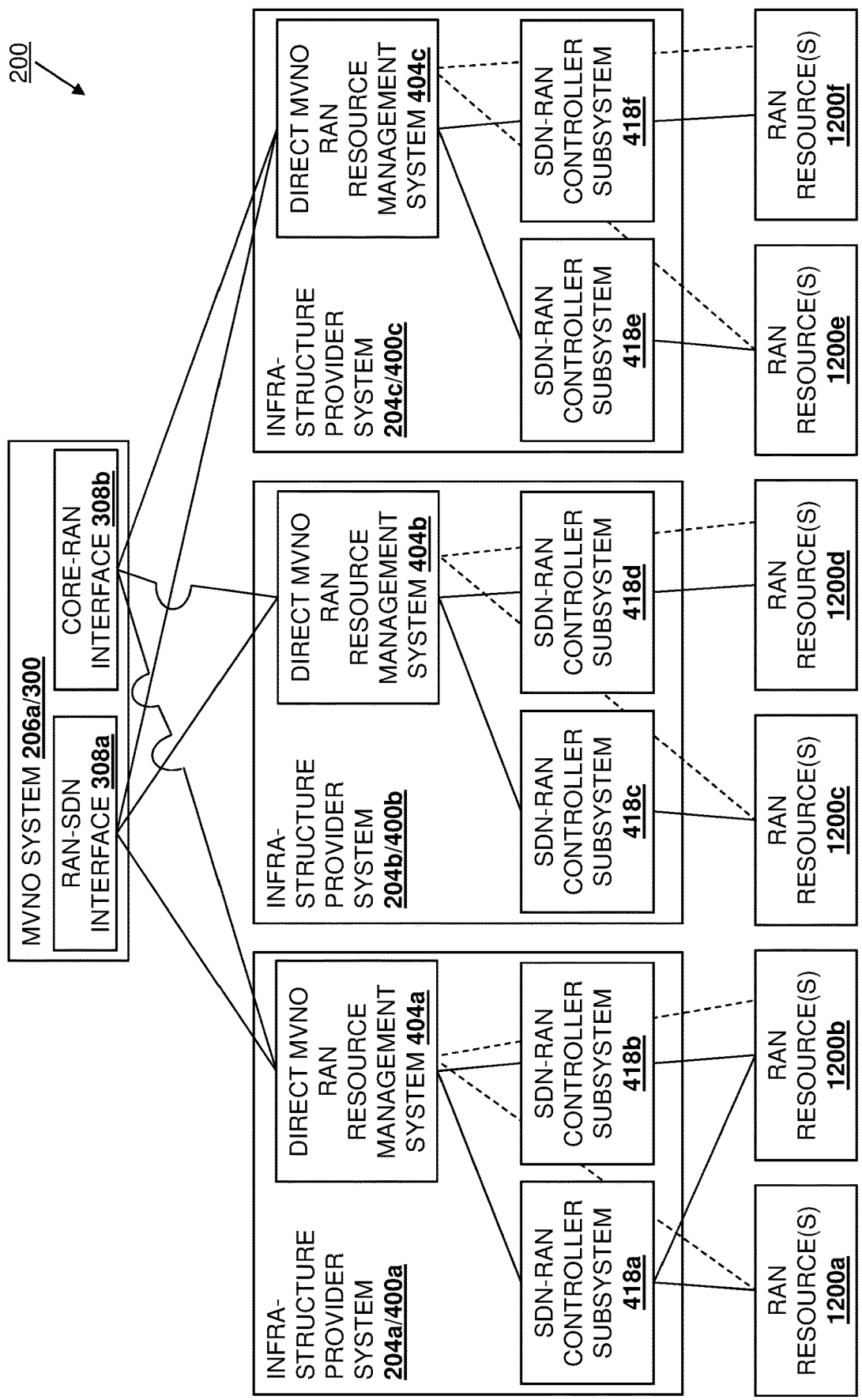
FIG. 12 is a schematic view illustrating an embodiment of the networked system of FIG. 2 operating during the method of FIG. 5.

With reference to FIG. 12, an embodiment of the present disclosure is illustrated to provide an example of how different InP systems 204a/400a, 204b/400b, and 204c/400c may provide respective direct MVNO RAN resource management systems 404a, 404b, and 404c to an MVNO system 206a/300, with the InP system 204a/400a including SDN-RAN controller subsystems 418a and 418b that control access to RAN resource(s) 1200a and 1200b, the InP system 204b/400b including SDN-RAN controller subsystems 418c and 418d that control access to RAN resource(s) 1200c and 1200d, and the InP system 204c/400c including SDN-RAN controller subsystems 418e and 418f that control access to RAN resource(s) 1200e and 1200f (and with the RAN resource(s) 1200a-1200f including a portion of the RAN resource(s) 202a-202b that have been allocated to the MVNO system 206a/300). As will be appreciated by one of skill in the art in possession of the present disclosure, the multiple respective direct MVNO RAN resource management systems 404a, 404b, and 404c deployed across respective InP systems 204a/400a, 204b/400b, and 204c/400c provide for the management of the RAN resources allocated to the MVNO system 206a/300 via a single administration, allowing the MVNO system 2062/300 to create, delete, and update RAN resources/slices across the RAN resource(s) 1200a-1200f without the involvement of the InP systems 204a/400a, 204b/400b, and 204c/400c.

Thus, systems and methods have been described that allow InP systems to abstract SDN-enabled RAN control subsystems and expose RAN resource control functions to MVNO systems in order to provide the MVNO subsystems the interfaces (e.g., APIs) needed to directly manage, observe, and orchestrate their portion of RAN resources allocated to them by the InP systems. As discussed above, each direct MVNO RAN resource management system may provide a virtualized layer between SDN-RAN controller subsystems and an MVNO system that abstracts the underlying network topology and infrastructure while exposing some level of RAN control functionality to the MVNO system that provides the MVNO system with direct access to and control of its allocated portion of the RAN resources, allowing the MVNO system to create and modify RAN slices tailored to the needs of its verticals, observe and optimize its RAN slices, and reconfigure RAN slices based on RAN resource monitoring in order to achieve particular levels of QoS and QoE at runtime. Furthermore, each direct MVNO RAN resource management system hides the actual topology of the InP system from its MVNO system while providing the high flexibility and direct access for that MVNO system to its allocated RAN slice, thus facilitating adoption by InP systems that are hesitant to expose their infrastructure. Finally, the direct MVNO RAN resource management systems support multi-domain MVNO deployment and SDN-handover operations by levering the direct access of RAN slices and handover agent functionality included in the direct MVNO RAN resource management systems, allowing MVNO systems that provide end-to-end services to multiple/diverse verticals to take advantage of the direct RAN slice control to quickly tune configurations of (and take immediate action associated with) RAN slices to tailor their operation to the needs of those verticals in order to meet QoS and QoE guarantees.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A networked system, comprising:
 a first Mobile Virtual Network Operator (MVNO) system;
 a plurality of physical Radio Access Network (RAN) resources; and
 at least one Infrastructure Provider (InP) system that couples the first MVNO system to the plurality of physical RAN resources, wherein the at least one InP system is configured to provide a first direct MVNO RAN resource management system for the first MVNO system that is configured to:
  virtualize a first portion of the plurality of physical RAN resources to provide first virtualized RAN resources that are allocated to the first MVNO system;
  receive, from the first MVNO system, a first virtualized RAN resource command that is directed to the first virtualized RAN resources allocated to the first MVNO system;
  automatically translate, in response to receiving the first virtualized RAN resource command, the first virtualized RAN resource command to a first physical RAN resource command that is configured to cause the performance of at least one first management operation associated with the first portion of the plurality of physical RAN resources; and
  automatically transmit, subsequent to translating the first virtualized RAN resource command to the first physical RAN resource command, the first physical RAN resource command to cause the performance of the at least one first management operation associated with the first portion of the plurality of physical RAN resources.

2. The system of claim 1, wherein the automatically transmitting the first physical RAN resource command includes:
automatically transmitting the first physical RAN resource command to a RAN controller that is included in the at least one InP system and that is associated with the first portion of the plurality of physical RAN resources, wherein the RAN controller is configured to cause the at least one first management operation to be performed in association with the first portion of the plurality of physical RAN resources.

3. The system of claim 1, wherein the first direct MVNO RAN resource management system is configured to:
receive, subsequent to transmitting the first physical RAN resource command, a first physical RAN resource command confirmation that indicates that the at least one first management operation has been performed in association with the first portion of the plurality of physical RAN resources; and
automatically transmit, in response to receiving the first physical RAN resource command confirmation, a first virtualized RAN resource command confirmation to the first MVNO system that indicates that the at least one first management operation has been performed in association with the first virtualized RAN resources.

4. The system of claim 1, wherein the at least one first management operation associated with the first portion of the plurality of physical RAN resources includes at least one of:
a RAN resource modification management operation that is configured to modify the first portion of the plurality of physical RAN resources that are virtualized as the first virtualized RAN resources; or
a RAN resource deletion management operation that is configured to delete the first portion of the plurality of physical RAN resources that are virtualized as the first virtualized RAN resources.

5. The system of claim 1, wherein the at least one first management operation associated with the first portion of the plurality of physical RAN resources includes at least one of:
a RAN resource use reporting management operation that is configured to report details about the use of the first portion of the plurality of physical RAN resources that are virtualized as the first virtualized RAN resources.

6. The system of claim 1, further comprising:
a second MVNO system, wherein the at least one InP system is configured to provide a second direct MVNO RAN resource management system for the second MVNO that is configured to:
virtualize a second portion of the plurality of physical RAN resources to provide second virtualized RAN resources that are allocated to the second MVNO system;
receive, from the second MVNO system, a second virtualized RAN resource command that is directed to the second virtualized RAN resources allocated to the second MVNO system;
automatically translate, in response to receiving the second virtualized RAN resource command, the second virtualized RAN resource command to a second physical RAN resource command that is configured to cause the performance of at least one second management operation associated with the second portion of the plurality of physical RAN resources; and
automatically transmit, subsequent to translating the second virtualized RAN resource command to the second physical RAN resource command, the second physical RAN resource command to cause the performance of the at least one second management operation associated with the second portion of the plurality of physical RAN resources.

7. An Information Handling System (IHS), comprising:
a processing system; and
a memory system that is coupled to the processing system and that includes instructions that, when executed by the processing system, cause the processing system to provide a first direct Mobile Virtual Network Operator (MVNO) Radio Access Network (RAN) resource management system for a first MVNO system, wherein the first direct MVNO RAN resource management system is configured to:
virtualize a first portion of a plurality of physical RAN resources to provide first virtualized RAN resources that are allocated to the first MVNO system;
receive, from the first MVNO system, a first virtualized RAN resource command that is directed to the first virtualized RAN resources allocated to the first MVNO system;
automatically translate, in response to receiving the first virtualized RAN resource command, the first virtualized RAN resource command to a first physical RAN resource command that is configured to cause the performance of at least one first management operation associated with the first portion of the plurality of physical RAN resources; and
automatically transmit, subsequent to translating the first virtualized RAN resource command to the first physical RAN resource command, the first physical RAN resource command to cause the performance of the at least one first management operation associated with the first portion of the plurality of physical RAN resources.

8. The IHS of claim 7, wherein the automatically transmitting the first physical RAN resource command includes:
automatically transmitting the first physical RAN resource command to a RAN controller that is associated with the first portion of the plurality of physical RAN resources, wherein the RAN controller is configured to cause the at least one first management operation to be performed in association with the first portion of the plurality of physical RAN resources.

9. The IHS of claim 7, wherein the first direct MVNO RAN resource management system is configured to:
receive, subsequent to transmitting the first physical RAN resource command, a first physical RAN resource command confirmation that indicates that the at least one first management operation has been performed in association with the first portion of the plurality of physical RAN resources; and
automatically transmit, in response to receiving the first physical RAN resource command confirmation, a first virtualized RAN resource command confirmation to the first MVNO system that indicates that the at least one first management operation has been performed in association with the first virtualized RAN resources.

10. The IHS of claim 7, wherein the at least one first management operation associated with the first portion of the plurality of physical RAN resources includes at least one of:
- a RAN resource modification management operation that is configured to modify the first portion of the plurality of physical RAN resources that are virtualized as the first virtualized RAN resources; or
- a RAN resource deletion management operation that is configured to delete the first portion of the plurality of physical RAN resources that are virtualized as the first virtualized RAN resources.

11. The IHS of claim 7, wherein the at least one first management operation associated with the first portion of the plurality of physical RAN resources includes at least one of:
- a RAN resource use reporting management operation that is configured to report details about the use of the first portion of the plurality of physical RAN resources that are virtualized as the first virtualized RAN resources.

12. The IHS of claim 7, wherein the memory system includes instructions that, when executed by the processing system, cause the processing system to provide a second direct MVNO RAN resource management system for a second MVNO system, wherein the second direct MVNO RAN resource management system is configured to
- virtualize a second portion of the plurality of physical RAN resources to provide second virtualized RAN resources that are allocated to the second MVNO system;
- receive, from the second MVNO system, a second virtualized RAN resource command that is directed to the second virtualized RAN resources allocated to the second MVNO system;
- automatically translate, in response to receiving the second virtualized RAN resource command, the second virtualized RAN resource command to a second physical RAN resource command that is configured to cause the performance of at least one second management operation associated with the second portion of the plurality of physical RAN resources; and
- automatically transmit, subsequent to translating the second virtualized RAN resource command to the second physical RAN resource command, the second physical RAN resource command to cause the performance of the at least one second management operation associated with the second portion of the plurality of physical RAN resources.

13. The IHS of claim 7, wherein the at least one first management operation is a handover management operation, and wherein the first physical RAN resource command is transmitted to a second direct MVNO RAN resource management system.

14. A method for providing direct management of Radio Access Network (RAN) resources by an Mobile Virtual Network Operator (MVNO), comprising:
- virtualizing, by a first direct Mobile Virtual Network Operator (MVNO) Radio Access Network (RAN) resource management system provided for a first MVNO system, a first portion of a plurality of physical RAN resources to provide first virtualized RAN resources that are allocated to the first MVNO system;
- receiving, by the first MVNO RAN resource management system from the first MVNO system, a first virtualized RAN resource command that is directed to the first virtualized RAN resources allocated to the first MVNO system;
- automatically translating, by the first MVNO RAN resource management system in response to receiving the first virtualized RAN resource command, the first virtualized RAN resource command to a first physical RAN resource command that is configured to cause the performance of at least one first management operation associated with the first portion of the plurality of physical RAN resources; and
- automatically transmitting, by the first MVNO RAN resource management system subsequent to translating the first virtualized RAN resource command to the first physical RAN resource command, the first physical RAN resource command to cause the performance of the at least one first management operation associated with the first portion of the plurality of physical RAN resources.

15. The method of claim 14, wherein the automatically transmitting the first physical RAN resource command includes:
- automatically transmitting the first physical RAN resource command to a RAN controller that is associated with the first portion of the plurality of physical RAN resources, wherein the RAN controller is configured to cause the at least one first management operation to be performed in association with the first portion of the plurality of physical RAN resources.

16. The method of claim 14, further comprising:
- receiving, by the first MVNO RAN resource management system subsequent to transmitting the first physical RAN resource command, a first physical RAN resource command confirmation that indicates that the at least one first management operation has been performed in association with the first portion of the plurality of physical RAN resources; and
- automatically transmitting, by the first MVNO RAN resource management system in response to receiving the first physical RAN resource command confirmation, a first virtualized RAN resource command confirmation to the first MVNO system that indicates that the at least one first management operation has been performed in association with the first virtualized RAN resources.

17. The method of claim 14, wherein the at least one first management operation associated with the first portion of the plurality of physical RAN resources includes at least one of:
- a RAN resource modification management operation that is configured to modify the first portion of the plurality of physical RAN resources that are virtualized as the first virtualized RAN resources; or
- a RAN resource deletion management operation that is configured to delete the first portion of the plurality of physical RAN resources that are virtualized as the first virtualized RAN resources.

18. The method of claim 14, wherein the at least one first management operation associated with the first portion of the plurality of physical RAN resources includes at least one of:
- a RAN resource use reporting management operation that is configured to report details about the use of the first portion of the plurality of physical RAN resources that are virtualized as the first virtualized RAN resources.

19. The method of claim 14, further comprising:
- virtualizing, by a second direct MVNO RAN resource management system provided for a second MVNO system, a second portion of the plurality of physical RAN resources to provide second virtualized RAN resources that are allocated to the second MVNO system;

receiving, by the second direct MVNO RAN resource management system from the second MVNO system, a second virtualized RAN resource command that is directed to the second virtualized RAN resources allocated to the second MVNO system;

automatically translating, by the second direct MVNO RAN resource management system in response to receiving the second virtualized RAN resource command, the second virtualized RAN resource command to a second physical RAN resource command that is configured to cause the performance of at least one second management operation associated with the second portion of the plurality of physical RAN resources; and automatically transmitting, by the second direct MVNO RAN resource management system subsequent to translating the second virtualized RAN resource command to the second physical RAN resource command, the second physical RAN resource command to cause the performance of the at least one second management operation associated with the second portion of the plurality of physical RAN resources.

20. The method of claim 14, wherein the at least one first management operation is a handover management operation, and wherein the first physical RAN resource command is transmitted to a second direct MVNO RAN resource management system.

* * * * *